United States Patent
Morita et al.

(10) Patent No.: US 9,655,055 B2
(45) Date of Patent: May 16, 2017

(54) WIRELESS COMMUNICATION SYSTEM, TRANSMISSION POWER CONTROL APPARATUS, BASE STATION APPARATUS, PARAMETER PROVIDING APPARATUS, AND TRANSMISSION POWER CONTROL METHOD

(71) Applicants: Motoki Morita, Tokyo (JP); Kojiro Hamade, Tokyo (JP)

(72) Inventors: Motoki Morita, Tokyo (JP); Kojiro Hamade, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 14/372,371

(22) PCT Filed: Oct. 30, 2012

(86) PCT No.: PCT/JP2012/006935
§ 371 (c)(1),
(2) Date: Jul. 15, 2014

(87) PCT Pub. No.: WO2013/108315
PCT Pub. Date: Jul. 25, 2013

(65) Prior Publication Data
US 2015/0011229 A1   Jan. 8, 2015

(30) Foreign Application Priority Data

Jan. 17, 2012 (JP) ................................. 2012-007103

(51) Int. Cl.
*H04W 36/00* (2009.01)
*H04W 52/14* (2009.01)
(Continued)

(52) U.S. Cl.
CPC ......... *H04W 52/146* (2013.01); *H04W 16/24* (2013.01); *H04W 52/244* (2013.01);
(Continued)

(58) Field of Classification Search
CPC ......... H04W 36/0055; H04W 36/0083; H04W 36/12; H04W 36/16; H04W 72/005;
(Continued)

(56) References Cited

U.S. PATENT DOCUMENTS

| 8,369,858 B2* | 2/2013 | Vasudevan | ............ H04W 48/16 455/436 |
| 2006/0264218 A1* | 11/2006 | Zhang | ................. H04W 72/005 455/450 |

(Continued)

FOREIGN PATENT DOCUMENTS

| JP | 2011-082636 A | 4/2011 |
| JP | 2011-082944 A | 4/2011 |

(Continued)

OTHER PUBLICATIONS

International Search Report corresponding to PCT/JP2012/006935 dated Nov. 27, 2012 (4 pages).

(Continued)

*Primary Examiner* — Jean Gelin
(74) *Attorney, Agent, or Firm* — Wilmer Cutler Pickering Hale and Dorr LLP

(57) ABSTRACT

A wireless communication system includes a first base station (3), a plurality of second base stations (1-1 and 1-2) and a control apparatus (10). The first base station forms a first cell (6). The plurality of second base stations (1-1 and 1-2) forms a plurality of second cells (5-1 and 5-2) each including a portion thereof partially overlapping with the first cell. The control apparatus (10) executes uplink transmission power control for a target second cell (5-1) by using a resource parameter (R1) which increases and decreases in accordance with a sum of usage amounts or sum of usage rates of uplink resources in the plurality of second cells (5-1 and 5-2).

50 Claims, 13 Drawing Sheets

(51) Int. Cl.
*H04W 52/24* (2009.01)
*H04W 16/24* (2009.01)
*H04W 16/32* (2009.01)
*H04W 84/04* (2009.01)

(52) U.S. Cl.
CPC .......... *H04W 16/32* (2013.01); *H04W 84/042* (2013.01); *H04W 84/045* (2013.01)

(58) Field of Classification Search
CPC ..... H04W 72/02; H04W 72/04; H04W 72/12; H04W 72/0406; H04W 72/044; H04W 72/048; H04W 72/1284; H04A 52/146; H04A 16/32; H04A 52/244; H04A 16/24; H04A 84/042; H04A 84/045
USPC ... 455/405, 414.1, 414.2, 432.2, 432.3, 434, 455/449, 450, 452.1, 452.2, 453, 522
See application file for complete search history.

(56) References Cited

U.S. PATENT DOCUMENTS

| | | | |
|---|---|---|---|
| 2009/0264077 A1 | 10/2009 | Damnjanovic | |
| 2010/0087221 A1* | 4/2010 | Srinivasan | H04W 16/08 455/522 |
| 2010/0273432 A1 | 10/2010 | Meshkati et al. | |
| 2011/0105129 A1* | 5/2011 | Kim | H04W 36/0083 455/443 |
| 2011/0207467 A1* | 8/2011 | Hanaki | H04W 72/0486 455/450 |
| 2012/0057547 A1* | 3/2012 | Lohr | H04L 5/0007 370/329 |
| 2012/0165028 A1* | 6/2012 | Kim | H04W 52/143 455/449 |
| 2012/0214495 A1* | 8/2012 | Choi | H04W 36/0055 455/444 |
| 2013/0034081 A1* | 2/2013 | Ban | H04W 36/16 370/331 |
| 2013/0114562 A1* | 5/2013 | Seo | H04W 52/146 370/329 |
| 2013/0201960 A1* | 8/2013 | Kim | H04W 72/0446 370/331 |
| 2014/0112263 A1* | 4/2014 | Lee | H04W 72/1289 370/329 |
| 2014/0113645 A1* | 4/2014 | Sagae | H04W 52/146 455/452.1 |

FOREIGN PATENT DOCUMENTS

| | | |
|---|---|---|
| JP | 2011-518519 A | 6/2011 |
| JP | 2012-525086 A | 10/2012 |
| WO | WO-2010/124243 A1 | 10/2010 |
| WO | WO-2012/042730 A1 | 4/2012 |

OTHER PUBLICATIONS

3GPP TR 36.921 V10.0.0, "Evolved Universal Terrestrial Radio Access (E-UTRA), FDD Home eNode B (HeNB) Radio Frequency (RF) Requirements Analysis," Apr. 2011, pp. 1-45.

Jacek Gora, et al., "Cell-Specific Uplink Power Control for Heterogeneous Networks in LTE," Vehicular Technology Conference Fall (VTC 2010-Fall), (5 pages), IEEE 72nd, Sep. 6-9, 2010, (online), IEEE Xplore URL: http://ieeexplore.ieee.org/xp/freeabs_all.jsp?arnumber=5594439.

Japanese Office Action issued by the Japan Patent Office for Application No. 2013-554087 dated Nov. 22, 2016 (5 pages).

* cited by examiner

WIRELESS COMMUNICATION SYSTEM, TRANSMISSION POWER CONTROL APPARATUS, BASE STATION APPARATUS, PARAMETER PROVIDING APPARATUS, AND TRANSMISSION POWER CONTROL METHOD

CROSS-REFERENCE TO RELATED APPLICATIONS

This application is a national stage application of International Application No. PCT/JP2012/006935 entitled "Wireless Communication System, Transmission Power Control Apparatus, Base Station Apparatus, Parameter Providing Apparatus, And Transmission Power Control Method," filed on Oct. 30, 2012, which claims the benefit of the priority of Japanese Patent Application No. 2012-007103, filed on Jan. 17, 2012, the disclosures of each of which are hereby incorporated by reference in their entirety.

TECHNICAL FIELD

The present invention is related to uplink transmission power control in a wireless communication system.

BACKGROUND ART

In recent years, with popularization of smart phones, or the like, data communication traffic volume in mobile service has increased notably. Further, 70% of all data communication traffic is generated and takes place in the indoor communication such as a user home, small business office, and a commercial facility, or the like. In order to accommodate such increase in the traffic demand, the development of base station, which is ultra compact and operable for indoor installation, is ongoing. The transmission power of such ultra compact base station is small compared with that of a base station (hereinafter, referred to as macro base station) arranged outdoor, and the communication area (i.e., cell) of the ultra compact base station is extremely small compared with that of the macro base station. Accordingly, the communication area of the ultra compact base station is referred to as femtocell, and the base station that is ultra compact is referred to as femtocell base station. The femtocell base station has received attention, not only for its ability to accommodate the above stated high demand traffic, but also as an expansion means of coverage (communication area satisfying certain quality) due to its ability to be arranged at locations radio wave struggle to reach such as high rise buildings or underground facilities.

There is an ongoing examination to use the femtocell base station with wireless communication standard of mobile telephone such as 3GPP (3$^{rd}$ Generation Partnership Project) W-CDMA and E-UTRA, or the like, as well as wireless communication standard of wireless MAN (Wireless Metropolitan Area Network) such as IEEE 802.16m, or the like. In W-CDMA (Wideband Code Division Multiple Access) standard, the femtocell base station is referred to as Home NodeB (HNB). Further, in 3GPP E-UTRA (Evolved Universal Terrestrial Radio Access) standard which is referred to as LTE (Long Term Evolution), the femtocell base station is referred to as Home eNodeB (HeNB). The femtocell base station is connected to an upper network (e.g., core network of telecommunication carrier) directly or via femto GW (gateway). The femto GW is referred to as Home NodeB Gateway in W-CDMA standard, and Home eNodeB Gateway in E-UTRA standard.

Note that in this specification, a mobile station which is connected to and communicates with the femtocell base station is referred to as "femtocell mobile station," and a mobile station which is connected to and communicates with the macro base station is referred to as "macro mobile station."

When the femtocell base station is used in the W-CDMA system, a data transmission/reception through a dedicated channel accompanying a transmission power control for an uplink and a downlink, and/or a data transmission/reception through a shared channel for a downlink are carried out. Further, when the femtocell base station is used in the E-UTRA system, radio frequency band and time are segmented into resource blocks (PRB; Physical Resource Block). A scheduler arranged at the base station performs PRB allocation, and then a data transmission/reception using the allocated PRBs is carried out. Further, when the femtocell base station is used in the IEEE 802.16m system, OFDMA (Orthogonal Frequency Division Multiple Access) is used, and a radio frequency band is divided into subcarriers. A scheduler arranged at the base station allocates the subcarriers, and a data transmission/reception using the allocated subcarriers is carried out. A bundle of subcarriers corresponds to a resource block in E-UTRA.

Further, as one of the operation configurations for a femtocell, the operation configuration in which only mobile stations which are registered in advance are operable to use the femtocell is known. In 3GPP, a group of mobile stations which are registered in advance is referred to as a Closed Subscriber Group (CSG), and a cell which only mobile stations included in the CSG are permitted to belong is referred to as a CSG cell. In CSG, when a mobile station is within the femtocell and is registered with the femtocell base station, the mobile station is operable to connect to the network via the femtocell base station. On the other hand, the mobile station which is not registered with the femtocell base station is not operable to connect to the network via the femtocell base station, or is limited when communicating with the femtocell base station compared with the mobile station which is registered.

One of the interference scenarios anticipated when using the femto cell base station is that there is a scenario in which the femtocell causes uplink interference to the macro cell. Here, the uplink interference is an interference caused to an uplink reception of the base station (in other words, uplink transmission of mobile station) from uplink transmission of mobile stations of another cell. That is to say, in such interference scenario, the interference which the uplink transmission of the femtocell mobile station causes to the uplink reception of the macro base station (in other words, uplink transmission of macro mobile station) is the subject. For this interference scenario, it is particularly problematic when the uplink frequency band of the femtocell and the macro cell are identical, the femtocell is the CSG cell, and the femtocell base station is arranged near the macro base station. In such case, since the transmission power of the macro mobile station which is arranged near the femtocell base station is relatively small, the interference caused by the uplink transmission of the femtocell mobile station to the uplink transmission of the macro mobile station is critical.

Non-Patent Literatures 1 and 2 and Patent Literature 1 disclose the technique to suppress the interference from the femtocell to the macro cell. Non-patent Literatures 1 and 2 each disclose controlling uplink transmission power of a femtocell by taking into account a propagation loss between the femtocell and the macro cell. To be more specific, Non-Patent Literature 1 discloses measuring a propagation loss between the femtocell base station and the macro base station, and performing the transmission power control so that the uplink transmission power of the femtocell mobile station becomes smaller as the propagation loss is smaller. The uplink transmission power control may be performed by adjusting uplink target received power at the femtocell base station or adjusting uplink maximum transmission power at the femtocell mobile station.

Patent Literature 1 focuses on that the number of femtocell base stations arranged within the macro cell changes, and aims to suppress the uplink interference to the macro cell from the plurality of femtocells arranged within the macro cell regardless of the number of the femtocell base stations within the macro cell. In order to achieve the aim, Patent Literature 1 discloses the following method. That is the method disclosed in Patent Literature 1 includes: calculating the number of femtocell base station arranged within the macro cell and with which a femtocell mobile station is communicating; dividing the permissible value of an entire uplink interference received at the macro base station by the calculated number of femtocell base station in order to estimate the upper limit of the uplink interference quantity permitted per femtocell base station; and setting the maximum transmission power of the femtocell mobile station by using the estimated upper limit of the uplink interference quantity and the propagation loss between the femtocell mobile station and the macro base station.

CITATION LIST

Patent Literature

Patent Literature 1: Japanese Unexamined Patent Application Publication No. 2011-82636

Non Patent Literature

Non-Patent Literature 1: J. Góra, K. I. Pedersen, A. Szufarska, S. Strzyz, "Cell-Specific Uplink Power Control for Heterogeneous Networks in LTE", Vehicular Technology Conference Fall (VTC 2010-Fall), 2010 IEEE 72nd, 6-9 Sep. 2010, [online], IEEE Xplore <URL: http://ieeexplore.ieee.org/xpl/freeabs_all.jsp?arnumber=5594439>, [retrieved on 9 Dec. 2011]
Non-Patent Literature 2: 3GPP TR 36.921 V10.0.0 (2011-04), "Evolved Universal Terrestrial Radio Access (E-UTRA), FDD Home eNode B (HeNB) Radio Frequency (RF) requirements analysis", April 2011

SUMMARY OF INVENTION

Technical Problem

As stated above, the method disclosed in Patent Literature 1 calculates the number of femtocell base station arranged within the macro cell and with which a femtocell mobile station is communicating, and controls uplink transmission power of femtocell mobile stations by using the calculated number of femtocell base stations. However, the inventors of the present invention has discovered that the method of Patent Literature 1 has a problem as stated below. That is, Patent Literature 1 takes into account the number of femtocell base station with which the femtocell mobile station is communicating, but does not enough take into account an usage of uplink resources at the femtocell base station. Note that, Non-Patent Literatures 1 and 2 include no disclosure whatsoever on the solution to this problem.

For example, even when there are a large number of femtocell base stations with which one or more femtocell mobile stations are engaged in communication, it is expected that there is a situation in which uplink resources actually used by femtocells is small. When femtocells arranged within a macro cell utilize small uplink resources, entire uplink interference caused to the macro base station may be small. Alternatively, the macro base station can probably avoid using uplink resources suffering from large uplink interference caused by femtocells, and select and use uplink resources suffering small uplink interference. In such situations, using the method disclosed in Patent Literature 1 may reduce the transmission power of the femtocell mobile station excessively and may potentially deteriorate uplink communication quality of femtocells more than necessary.

Note that the above stated problem with Patent Literature 1 may occur not only in the environment including a macro cell and femtocells, but also more generally in the environment in which small scale cells are arranged within a large scale cell. Such environment is referred to as a Hierarchical Cell Structure (HCS), or a Heterogeneous Network (HetNet).

The present invention is made based on the above stated findings obtained by the inventors. That is, the present invention is intended to provide a wireless communication system, a transmission power control apparatus, a base station apparatus, a parameter providing apparatus, and a transmission power control method and program that are capable of contributing to avoid excessive reduction of uplink communication quality of small scale cells due to suppression of uplink interference to a large scale cell in an environment in which the small scale cells are arranged within the large scale cell.

Solution to Problem

A first aspect of the present invention includes a wireless communication system. The wireless communication system includes a first base station, a plurality of second base stations, and a control apparatus. The first base station forms a first cell. The plurality of second base stations form a plurality of second cell each having an area smaller than that of the first cell and each including a portion thereof partially overlapping with the first cell. The control apparatus executes uplink transmission power control for a target cell included in the plurality of second cells by using a resource parameter which increases and decreases in accordance with a sum of usage amounts or sum of usage rates of uplink resources in the plurality of second cells.

A second aspect of the present invention includes a transmission power control apparatus used in a wireless communication system. The wireless communication system includes a first base station that forms a first cell, and a plurality of second base stations that form a plurality of second cells each having an area smaller than that of the first cell and each including a portion thereof partially overlapping with the first cell. The transmission power control apparatus is configured to execute uplink transmission power control for a target cell included in the plurality of second cells by using a resource parameter which increases and decreases in accordance with a sum of usage amounts or sum of usage rates of uplink resources in the plurality of second cells.

A third aspect of the present invention includes a base station apparatus. The base station apparatus includes the transmission power control apparatus according to the second aspect described above, and a wireless communication unit operable to communicate with a mobile station belonging to the target cell.

A fourth aspect of the present invention includes a parameter providing apparatus used in a wireless communication system. The wireless communication system includes a first base station that forms a first cell, a plurality of second base stations that form a plurality of second cells each having an area smaller than that of the first cell and each including a portion thereof partially overlapping with the first cell, and control unit that executes uplink transmission power control for a target cell included in the plurality of second cells formed by the plurality of second base stations. The parameter providing apparatus is configured to supply to the control means a resource parameter to be used in the uplink transmission power control, the resource parameter increasing and decreasing in accordance with a sum of usage amounts or sum of usage rates of uplink resources in the plurality of second cells.

A fifth aspect of the present invention includes a transmission power control method used in a wireless communication system. The wireless communication system includes a first base station that forms a first cell, and a plurality of second base stations that form a plurality of second cells each having an area smaller than that of the first cell and each including a portion thereof partially overlapping with the first cell. The transmission power control method includes executing uplink transmission power control for a target cell included in the plurality of second cells by using a resource parameter which increases and decreases in accordance with a sum of usage amounts or sum of usage rates of uplink resources in the plurality of second cells.

A sixth aspect of the present invention includes a program causing a computer to perform the transmission power control method according to the fifth aspect described above.

Advantageous Effects of Invention

According to the above-mentioned aspects, it is possible to provide a transmission power control apparatus, a base station apparatus, a parameter providing apparatus, a transmission power control method, and a program that are capable of contributing to avoid excessive reduction of uplink communication quality of small scale cells due to suppression of uplink interference to a large scale cell in an environment in which the small scale cells are arranged within the large scale cell.

DESCRIPTION OF EMBODIMENTS

Figure 1:
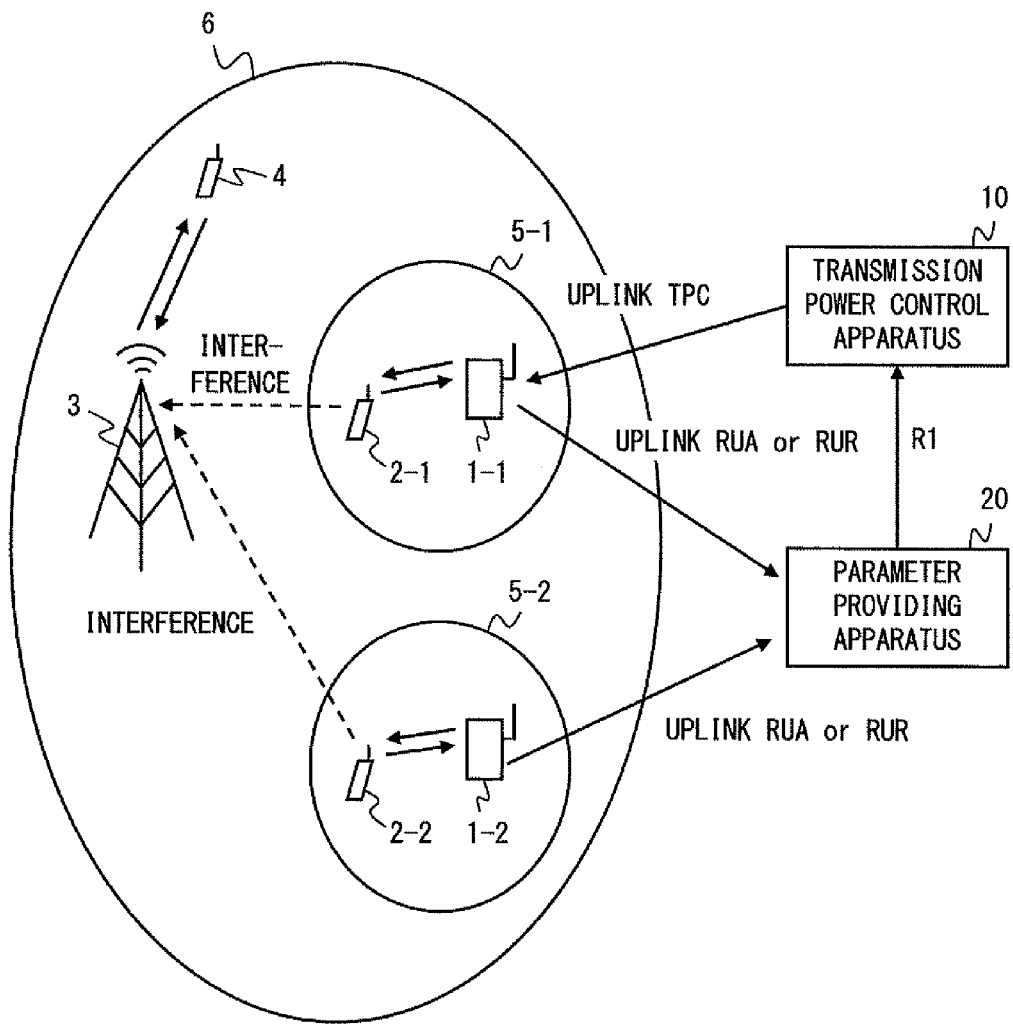
FIG. 1 is a diagram showing a configuration example of a wireless communication system according to a first embodiment of the present invention.

Specific embodiments of the present invention will be described in detail below with reference to the drawings. The same or corresponding components are denoted by the same reference numerals throughout the drawings, and a repeated description thereof is omitted as needed to clarify the explanation.

First Embodiment

FIG. 1 illustrates an example of a network configuration of a wireless communication system according to the first embodiment of the present invention. The wireless communication system according to the present embodiment includes a plurality of femtocell base stations 1 and a macro base station 3. Each femtocell base station 1 forms a femtocell 5, and carries out wireless communications with a femtocell mobile station 2. The macro base station 3 forms a macro cell 6, and carries out wireless communications with a macro mobile station 4. Each femtocell 5 includes at least a portion thereof overlapping with the macro cell 6.

According to an example in FIG. 1, the plurality of femtocell base stations 1 include two femtocell base stations 1-1 and 1-2. The femtocell base stations 1-1 and 1-2 form femtocells 5-1 and 5-2, respectively. The femtocells 5-1 and 5-2 each include at least a portion thereof overlapping with a portion of the macro cell 6. The femtocell base station 1-1 carries out wireless communications with the femtocell mobile station 2-1 within the femtocell 5-1. In the similar manner, the femtocell base station 1-2 carries out wireless communications with the femtocell mobile station 2-2 within the femtocell 5-2.

As stated already, the femtocells 5-1 and 5-2, which overlap with the macro cell 6, each cause an uplink interference to the macro cell 6. That is, the uplink transmission of the femtocell mobile stations 2-1 and 2-2 cause an interference to the uplink reception of the macro base station 3 (i.e., uplink transmission of the macro mobile station 4). In order to suppress the uplink interference from the femtocell 5 to the macro cell 6, the transmission power control apparatus 10 carries out uplink transmission power control (uplink TPC (Transmission Power Control)) of the femtocell 5. Hereinbelow, the description will be made with respect to the femtocell 5-1 being the subject of the control carried out by the transmission power control apparatus 10. It is to be noted that the transmission power control apparatus 10 may be configured to control the uplink transmission power of a plurality of femtocells 5 (e.g., cells 5-1 and 5-2). Further, in order to carry out the uplink transmission power control of the plurality of femtocells 5, the transmission power control apparatus 10 may be arranged for each of the femtocell 5.

The transmission power control apparatus 10 may carry out the uplink transmission control considering a propagation loss $L_M$ between the femtocell 5-1 and the macro cell 6 in the same manner as the method disclosed in Non-Patent Literatures 1 and 2. Note that a propagation loss between the femtocell mobile station 2-1 and the macro base station 3, or a propagation loss between the femtocell base station 1-1 and the macro base station 3 may be used for the propagation loss $L_M$. To be more specific, the transmission power control apparatus 10 may carry out the transmission power control to lower the transmission power of the femtocell mobile station 2-1 as the propagation loss $L_M$ becomes smaller.

There are various control methods to adjust the transmission power of the femtocell mobile station 2-1. To be more specific, the transmission power of the femtocell mobile station 2-1 may be adjusted in accordance with an uplink transmission power control method as specified in W-CDMA, E-UTRA, IEEE 802.16m, or the like. For example, the transmission power control apparatus 10 may adjust an uplink target received power $P_{O\_H}$ at the femtocell base station 1-1. In this case, the femtocell base station 1-1 controls the transmission power of the femtocell mobile station 2-1 such that the reception power of an uplink signal from the femtocell mobile station 2-1 comes near the uplink target received power $P_{O\_H}$. For example, the femtocell base station 1-1 may report the uplink target received power $P_{O\_H}$ to the femtocell mobile station 2-1. Alternatively, according to the so called closed loop transmission power control, the femtocell base station 1-1 may give an instruction to the femtocell mobile station 2-1 on the increase or decrease of the transmission power so as to approach the uplink target received power $P_{O\_H}$. Further, the transmission power control apparatus 10 may adjust the maximum transmission power $P_{MAX,H}$ of the femtocell mobile station 2-1 instead of the uplink target received power $P_{O\_H}$.

Further, the transmission power control apparatus 10 uses a resource parameter R1 for the transmission power control of the femtocell 5-1. The resource parameter R1 increases and decreases in accordance with a sum of uplink resource usage amounts or sum of uplink resource usage rates of uplink resources in the plurality of femtocells 5 (e.g., cells 5-1 and 5-2) which each include at least a portion thereof overlapping with the macro cell 6. Here, the uplink resource refers to the radio resources used for the transmission of uplink signals at the femtocell 5. The uplink resource is defined in general via frequency, time, spread code, or any combination thereof. For example, in a case of E-UTRA which employs SC-FDMA (Single-Carrier Frequency-Division Multiple Access) for the uplink, the unit for the uplink resource is a physical resource block (PRB) which is divided by frequency and time. Further, in a case where OFDMA is employed for the uplink, the unit for the uplink resource is an OFDM sub carrier. Further, in a case where CDMA is employed for the uplink, the unit for the uplink resource is the spread code (i.e., channelization code) or a physical channel distinguished by the spread code.

The transmission power control apparatus 10 carries out the uplink transmission control so as to reduce the uplink transmission power of the femtocell mobile station 2-1 which belongs to the target femtocell 5-1 in a manner corresponding to the increase of the sum of the usage amounts or sum of the usage rates of the uplink resources in the plurality of femtocells 5. In other words, the resource parameter R1 is determined such that the uplink transmission power of the femtocell mobile station 2-1 which belongs to the target femtocell 5-1 is reduced in a manner corresponding to the increase of the sum of the usage amounts or sum of the usage rates of the uplink resources in the plurality of femtocells 5. For example, the transmission power control apparatus 10 may reduce the uplink target received power $P_{O\_H}$ in accordance with the increase of the sum of the usage amounts or sum of the usage rates of the uplink resources in the plurality of femtocells 5. Alternatively, the transmission power control apparatus 10 may reduce the maximum transmission power $P_{MAX,H}$ of the femtocell mobile station 2-1 in accordance with the increase of the sum of the usage amounts or sum of the usage rates of the uplink resources in the plurality of femtocells 5.

A parameter providing apparatus 20 receives, from the plurality of femtocells 5, the uplink resource usage amount (RUA) or the uplink resource usage rate (RUA) in each femtocell 5. Then, the parameter providing apparatus 20 generates the resource parameter R1 by adding the plurality of received uplink resource usage amounts or usage rates, and supplies the generated parameter R1 to the transmission power control apparatus 10 for the uplink transmission power control of the target femtocell 5-1. Note that the parameter providing apparatus 20 may supply the resource parameter R1 to each of a plurality of transmission power control apparatuses 10 for the uplink transmission power control of the plurality of femtocells 5.

The resource parameter R1 includes a value which increases or decreases in accordance with the sum of the usage amounts or sum of the usage rates of the uplink resources in the plurality of femtocells 5. To be more specific, the resource parameter R1 may be defined as a monotonic function of the sum of the usage amounts or sum of the usage rates of the uplink resources in the plurality of femtocells 5. For example, the resource parameter R1 may include a parameter which is based on the sum of the usage rates of the uplink resource of the plurality of femtocells 5. More specifically, the resource parameter R1 may include at least one of:

(a) The sum of the uplink resource usage rates of the plurality of femtocells 5;
(b) The average value of the sum of the uplink resource usage rates of the plurality of femtocells 5, and the number of the plurality of femtocells 5;
(c) The sum of the uplink resource usage amounts of the plurality of femtocells 5; and
(d) The average value of the sum of the uplink resource usage amounts of the plurality of femtocells 5, and the number of the plurality of femtocells 5.

As stated above in relation to Patent Literature 1, it is insufficient to take into consideration only the number of the femtocell base station 1 with which the femtocell mobile station 2 is engaged in communication when it comes to the uplink transmission power control of the target cell 5-1. In contrast, the transmission power control apparatus 10 according to the present embodiment uses, in order to carry out the uplink transmission power control of the target femtocell 5-1, the resource parameter R1 which increases or decreases in accordance with the sum of the usage amounts or sum of the usage rates of the uplink resources in the plurality of femtocells 5 (e.g., cells 5-1 and 5-2) which are arranged in a manner overlapping at least partially with the macro cell 6. That is, according to the present embodiment, the uplink transmission power control of the target femtocell 5-1 is carried out while taking into consideration the entire uplink resource usage amount of the plurality of femtocells 5 (e.g., cells 5-1 and 5-2). To be more specific, it is preferable that the transmission power control apparatus 10 carries out the uplink transmission power control such that the uplink transmission power of the femtocell mobile station 2-1 which belongs to the target femtocell 5-1 is reduced in a manner corresponding to the increase of the sum of the usage amounts or sum of the usage rates of the uplink resource in the plurality of femtocells 5.

For example, even when the number of the femtocell base station 1 with which the femto cell mobile station 2 is communicating is large, it is expected that the uplink resources actually used at the plurality of femtocells 5 arranged within the macro cell 6 are few in some situations. When the uplink resource usage amount of the plurality of femtocells 5 arranged within the macro cell 6 is small, there may be an occasion where an entire uplink interference caused to the entire macro base station becomes small. In other cases, the macro base station 3 may select and use uplink resources suffering small uplink interference from the femtocell. When the method of Patent Literature 1 is used in such cases, the transmission power of the femtocell mobile station is reduced excessively thereby reducing the uplink communication quality of the femtocell more than necessary. However, according to the uplink transmission power control of the present embodiment in which the uplink resource usage amount of the plurality of femtocells 5 is taken into consideration, it becomes possible to prevent the excessive reduction of the uplink communication quality of the femtocell 5-1 due to suppression of the uplink interference to the macro cell 6.

Figure 2:
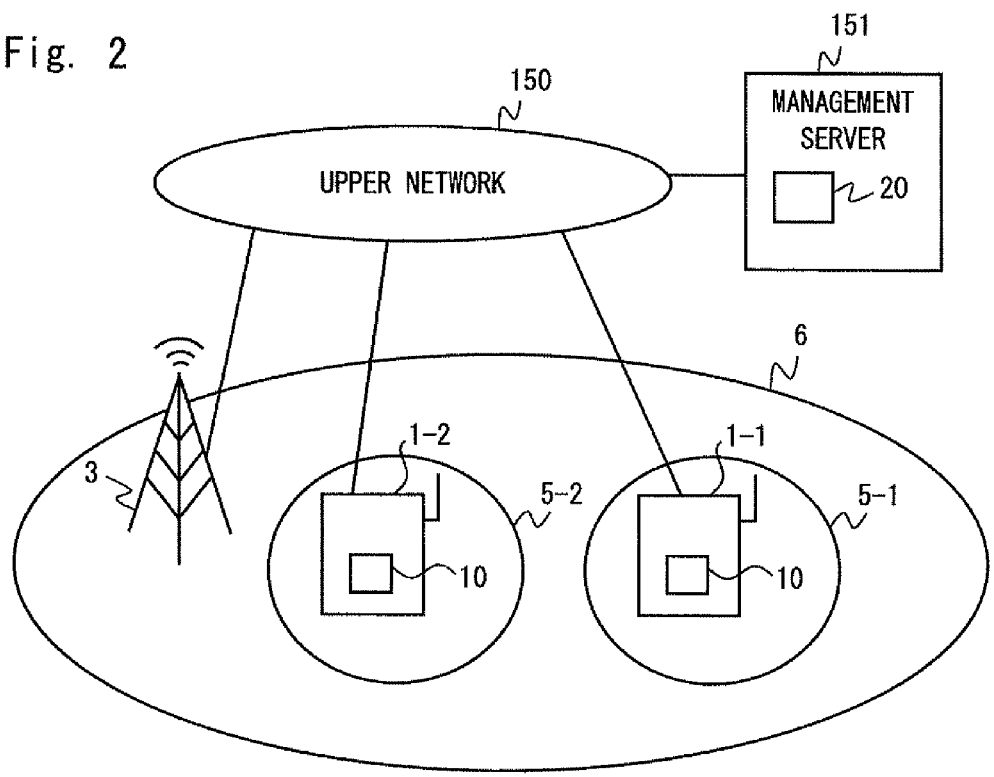
FIG. 2 is a diagram showing another configuration example of a wireless communication system according to the first embodiment of the present invention.

Now, it is to be noted that the arrangement of the transmission power control apparatus 10 and the parameter providing apparatus 20 needs to be appropriately determined in accordance with the design concept of the network architecture or wireless communication standard. For example, as shown in FIG. 2, the transmission power control apparatus 10 may be arranged in an integral manner with the femtocell base station 1. Further, the parameter providing apparatus 20 may be arranged at a management server 151 which is operable to communicate with the plurality of femtocell base stations 1 via an upper network 150. The upper network 150 includes, for example, a wireless access network and a core network of a telecommunication carrier, an IP (Internet Protocol) leased line, or a public Internet.

Figure 3:
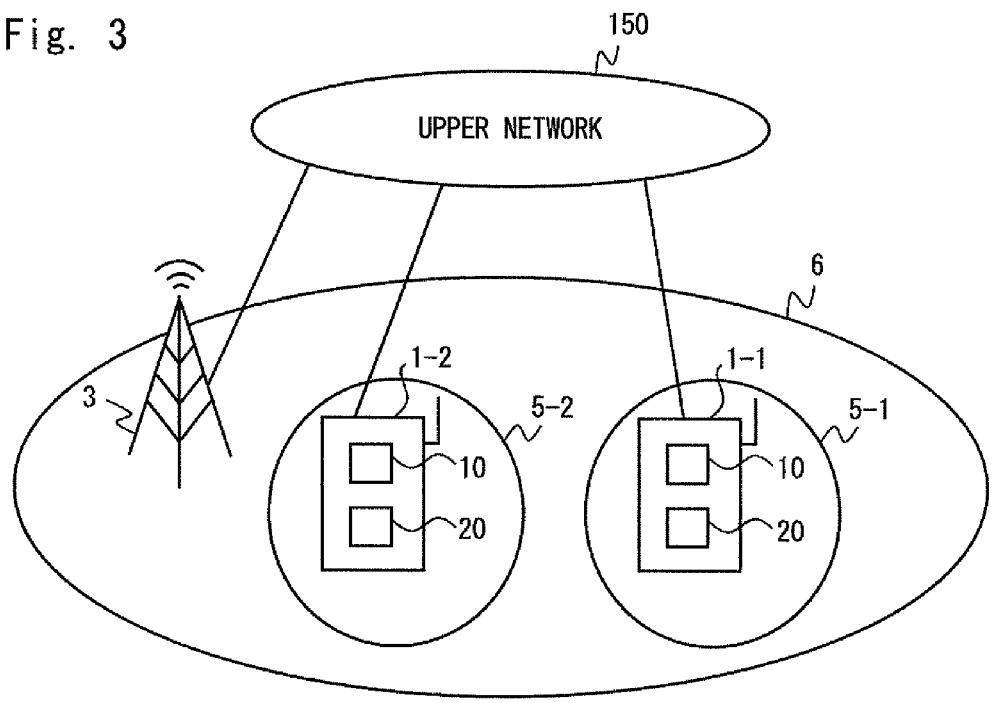
FIG. 3 is a diagram showing still another configuration example of a wireless communication system according to the first embodiment of the present invention.

As shown in FIG. 3, both the transmission power control apparatus 10 and the parameter providing apparatus 20 may be arranged in an integral manner with the femtocell base station 1. Further, features of the transmission power control apparatus 10 may be arranged in the wireless communication system in a separated manner. For example, the uplink transmission power control function of the transmission power control apparatus 10 may be realized via the femtocell mobile station 2, the femtocell base station 1 and a control apparatus (e.g., RNC (Radio Network Controller)) within the upper network 150.

The transmission power control apparatus 10 may be arranged at the femtocell mobile station 2-1. In such case, the femtocell mobile station 2-1 may receive the resource parameter R1 from the femtocell base station 1-1 or the management server 151, and correct its own uplink transmission power by using the parameter R1.

Figure 4:
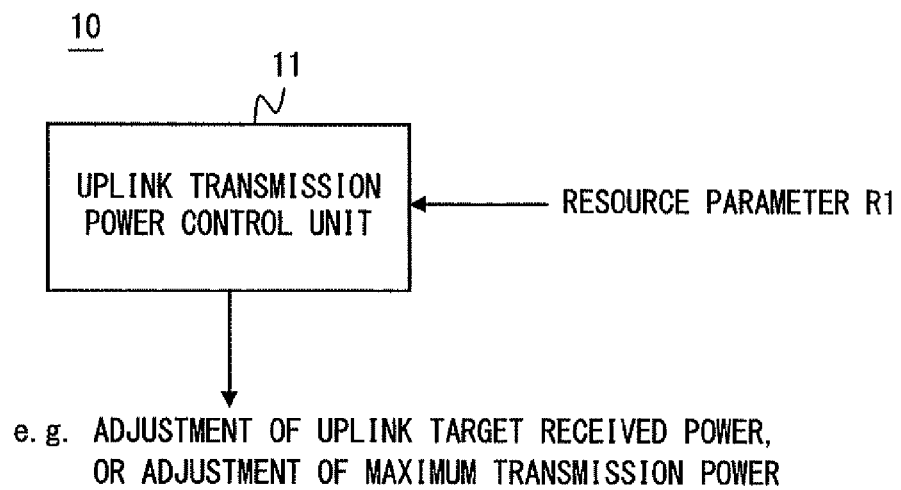
FIG. 4 is a block diagram showing a configuration example of transmission power control apparatuses described in FIGS. 1 to 3.

Hereinbelow, specific examples of the configuration and the operations of the transmission power control apparatus 10 and the parameter providing apparatus 20 will be described in detail. FIG. 4 is a block diagram illustrating a configuration example of the transmission power control apparatus 10. In FIG. 4, the transmission power control apparatus 10 includes an uplink transmission power control unit 11. The uplink transmission power control unit 11 receives the resource parameter R1 from the parameter providing apparatus 20. Then, the uplink transmission power control unit 11 carries out the uplink transmission power control of the femtocell mobile station 2 which belongs to a target femtocell 5 by using the parameter R1. The uplink transmission power control includes, for example, an adjustment of the uplink target received power $P_{O\_H}$ applied to the femtocell base station 1, or an adjustment of the maximum transmission power $P_{MAX,\,H}$ applied to the femtocell mobile station 2-1.

Figure 5:
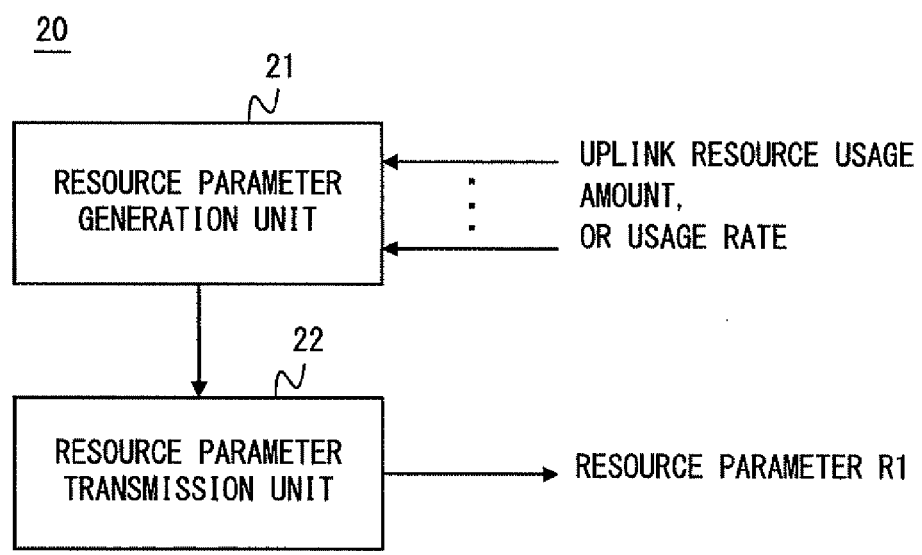
FIG. 5 is a block diagram showing a configuration example of parameter providing apparatuses described in FIGS. 1 to 3.

FIG. 5 is a block diagram illustrating a configuration example of the parameter providing apparatus 20. In FIG. 5, the parameter providing apparatus 20 includes a resource parameter generation unit 21 and a resource parameter transmission unit 22. The resource parameter generation unit 21 receives the usage amount or usage rate of uplink resources of each of the plurality of femtocells 5, and generates the resource parameter R1 by adding the received usage amounts or usage rates of uplink resources. The plurality of usage amounts or usage rates of uplink resources are sent to the resource parameter generation unit 21 from the apparatus arranged to manage the uplink radio resources, more particularly from the plurality of femtocell base stations 1 (e.g., base stations 1-1 and 1-2) or a control apparatus such as RNC. The resource parameter transmission unit 22 supplies the generated resource parameter R1 to the transmission power control apparatus 10.

Figure 6:
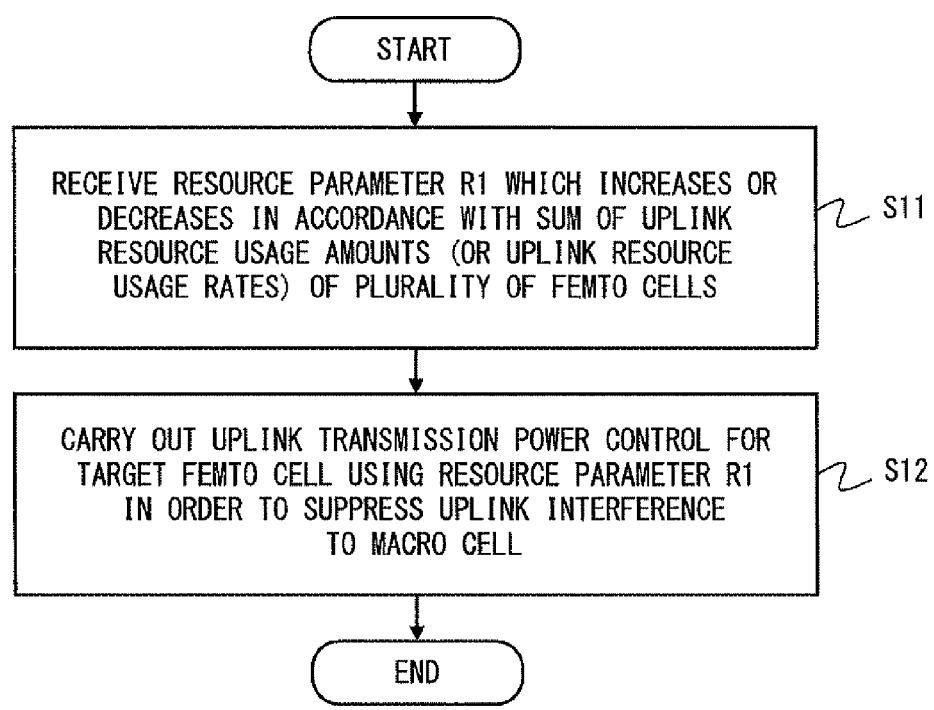
FIG. 6 is a flowchart showing a specific example of uplink transmission power control performed by a transmission power control apparatus.

FIG. 6 is a flowchart illustrating a specific example of the uplink transmission power control performed by the transmission power control apparatus 10. In Step S11, the transmission power control apparatus 10 receives the resource parameter R1 from the parameter providing apparatus 20. In Step S12, the transmission power control apparatus 10 carries out the uplink transmission power control for the target femtocell 5 by using the resource parameter R1.

Figure 7:
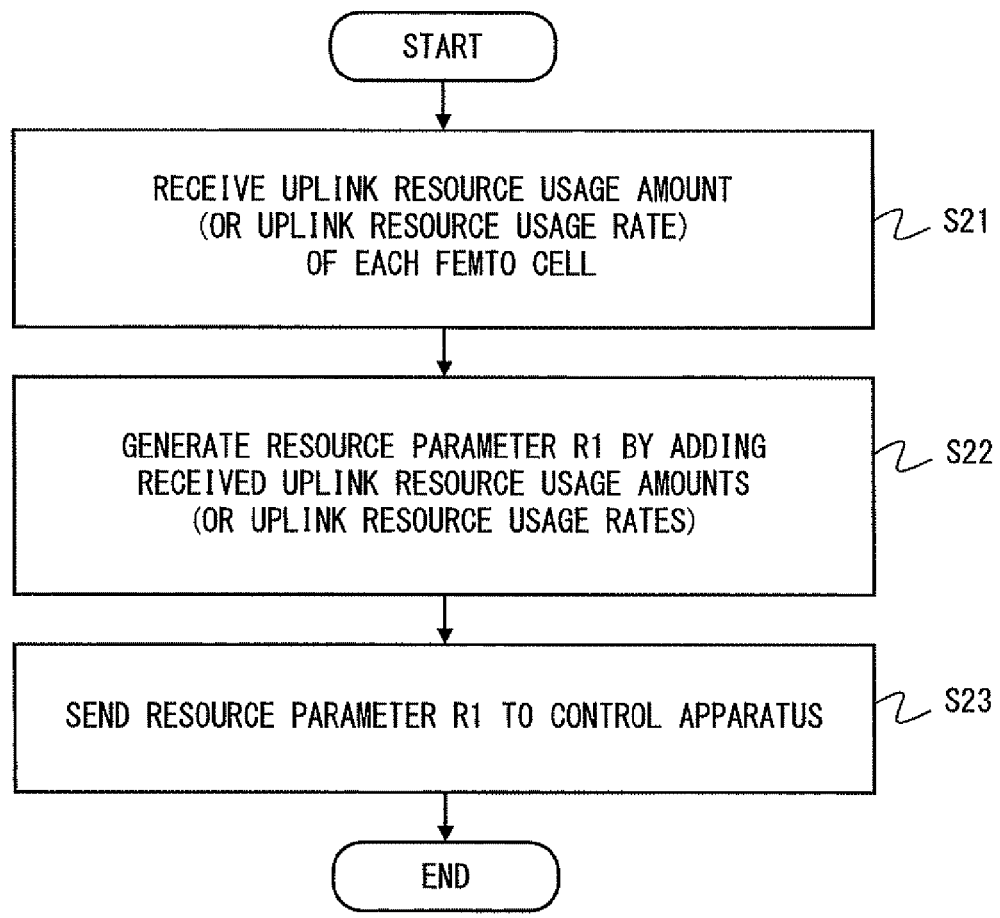
FIG. 7 is a flowchart showing a specific example of a procedure of providing a resource parameter performed by a parameter providing apparatus.

FIG. 7 is a flowchart illustrating an operation of the parameter providing apparatus 20. In Step S21, the parameter providing apparatus 20 receives the usage amount or usage rate of the uplink resources of each of the plurality of femtocells 5. In Step S22, the parameter providing apparatus 20 generates the resource parameter R1 by adding the usage amounts or usage rates of the uplink resources of the plurality of femtocells 5. In Step S23, the parameter providing apparatus 20 sends the resource parameter R1 to the transmission power control apparatus 10.

Second Embodiment

According to the present embodiment, a specific example of the first embodiment will be described. In the present embodiment, the description will be made in connection with the wireless communication system of LTE scheme.

Further, according to the present embodiment, the description will be made concerning an example in which the feature of the transmission power control apparatus 10 is arranged at the femtocell base station 1, and the feature of the parameter providing apparatus 20 is arranged at the management server 151 as in the configuration example in FIG. 2. Further, according to the present embodiment, the description will be made concerning an example in which the resource parameter R1 is applied to the uplink target received power $P_{O\_H}$ at the femtocell base station 1 for the transmission power control of the femtocell 5.

First, a specific example of a method to generate the uplink target received power $P_{O\_H}$ on to which the resource parameter R1 is applied will be described. Here, the total number of the plurality of femtocell base stations 1, which include the femtocell base station 1-1 as a control object, is N. First, an estimated value F [dB] of the SINR (Signal to Interference plus Noise Ratio) per uplink PRB transmitted by the macro mobile station 4 is defined under an assumption that the macro mobile station 4 is near the femtocell base station 1-1 as the control object. It is postulated that Γ must be greater than $Γ_{MIN}$. $Γ_{MIN}$ [dB] is the minimum value of SINR required in order for the uplink communication of the macro mobile station 4 to satisfy a predetermined quality. $Γ_{MIN}$ is set in advance.

In order to formulate Γ, desired wave power (uplink signal power of macro cell 6) and interference power need to take into consideration. Here, the interference power $I_H$ [dBm] caused to the uplink reception (desired wave) of the macro base station 3 by the femtocell mobile station 2-1 which belongs to the femtocell base station 1-1, which is a control object, and the contribution of another femtocell mobile station (mobile stations 2-2, or the like), which is arranged within the macro cell 6, are taken into consideration. Note that in LTE the plurality of macro mobile stations 4, which are arranged within a single macro cell 6, each use PRBs different from one another. Therefore, it is to be postulated that there is no interference from another macro cell mobile station within a single macro cell 6. Further, assuming that macro cell mobile stations and femtocell mobile stations which are within another macro cell are arranged sufficiently apart from the macro base station 3 in a relative manner, the interference therefrom is neglectable compared with $I_H$. As a result, when the interference power per femtocell mobile station 2-1 caused to the uplink reception of the macro base station 3 is the same, Γ is approximately defined by the following formula (1). Here, $S_M$ [dBm] is desired wave power, that is, an uplink received power from the macro mobile station 4 at the macro base station 3. In formula (1), since the resource parameter R1 is expressed in units of dB, the logarithm representation is used therefor. Further, it is assumed that thermal noise is neglectable. Further, formula (1) is composed of an arbitrary femtocell based on an assumption that the uplink interference power per one unit of femtocell mobile station is $I_H$ irrespective of the arrangement of the femtocell mobile station within the macro cell.

[Formula 1]

$$Γ \approx S_M - I_H - 10 \log_{10} R1 \geq Γ_{MIN} \quad (1)$$

As described for the first embodiment, it is preferable that the resource parameter R1 is a value which increases and decreases in accordance with the sum of the usage amounts or sum of the usage rates of the radio resources in the plurality of femtocells 5. Note, however, that in formula 1, the resource parameter R1 is defined as a monotonic increasing function of the sum of the usage amounts or sum of the usage rates of the radio resources in the plurality of femtocells 5. When defining the resource parameter R1 as a monotonic decreasing function of the sum of the usage amounts or sum of the usage rates of the radio resources in the plurality of femtocells 5, it is preferable that the negative sign of R1 in formula 1 is changed to positive. It is preferable that the resource parameter R1 is defined as the sum of the radio resource usage rate $U_{H,i}$ of each femtocell 5 as indicated in formula (2).

[Formula 2]

$$R1 = \sum_{i=1}^{N} U_{H,i} \quad (2)$$

Next, $S_M$ and $I_H$ are formulated. In LTE, the uplink transmission power control is carried out such that an average uplink transmission power $P_{UL,j}$ [dBm] per PRB complies with formula (3) below. Here, j is a subscript representing M or H, each corresponding to the macro mobile station 4 or the femtocell mobile station 2. $P_{MAX,j}$ [dBm] is an uplink maximum transmission power. $P_{O\_j}$ [dBm] is the uplink target received power. $L_j$ represents a propagation loss $L_M$ between the macro base station 3 and the femtocell mobile station 2-1, or a propagation loss $L_H$ between the femtocell base station 1-1 and the femtocell mobile station 2-1. Note that since it is assumed here that the macro mobile station 4 is arranged near the femtocell base station 1-1, it is assumed that the propagation loss between the macro base station 3 and the macro mobile station 4 is equal to the propagation loss $L_M$ between the macro base station 3 and the femtocell mobile station 2-1. $α_j$ is a correction value applied for the transmission loss $L_M$ and $L_H$.

[Formula 3]

$$P_{UL,j} = \mathrm{MIN}(P_{MAX,j}, P_{O\_j} + α_j \cdot L_j) \quad (3)$$

Considering a case in which $P_{UL,j}$ does not reach $P_{MAX,j}$ in formula (3), $S_M$ and $I_H$ may be expressed via the following formulas (4-1) and (4-2).

[Formula 4]

$$S_M = P_{O\_M} + α_M \cdot L_M - L_M \quad (4\text{-}1)$$

$$I_H = P_{O\_H} + α_H \cdot L_H - L_M \quad (4\text{-}2)$$

A condition which satisfies the equality of formula (1) corresponds to a situation in which SINR of the desired wave signal at the macro base station 3 is at its minimum. In other words, the condition which satisfies the equality of formula (1) corresponds to a situation in which the total of the uplink interference power from the plurality of femtocell mobile stations 2 reaches the upper limit. That is, in such situation, the transmission power of the femtocell mobile station 2-1 is the maximum permissible value. From the above, considering the condition which satisfies the equality of formula (1), as well as substituting formulas (4-1) and (4-2) in formula (1), the uplink target received power $P_{O\_H}$ is formulated as formula (5).

[Formula 5]

$$P_{O\_H} = P_{O\_M} - Γ_{MIN} + α_M \cdot L_M - α_H \cdot L_H - 10 \log_{10} R1 \quad (5)$$

By using formula (5), it becomes possible to reduce the uplink target received power $P_{O\_H}$ in a manner corresponding to the increase of the sum of the usage amounts or sum of the usage rates of the uplink resources in the plurality of femtocell 5. Note that when formula (5) is used, it is preferable that R1 is defined such that the size of the resource parameter R1 is constantly greater than or equal to 1 in order to prevent the $P_{O\_H}$ from becoming excessively large. For example, the resource parameter R1 may be restricted so that the minimum value is 1, or may be defined as a value obtained by adding "1" to the radio resource usage rates of the plurality of femtocells 5. By doing so, the resource parameter R1 is greater than or equal to 1 at all times.

By setting the uplink target received power $P_{O\_H}$ by using formula (5), it becomes possible to keep the uplink interference caused to the macro cell 6 by the plurality of femtocells 5 which overlap with the macro cell 6 below a certain level while maintaining the uplink interference power per each unit of the femtocell mobile station 2 at substantially the same level irrespective of the arrangement of the femtocell mobile station 2 within the macro cell 6. Further, it is possible to set the uplink transmission power of the femtocell mobile station 2 relatively high when the sum of the uplink PRB usage rates of the plurality of femtocells 5 is relatively low regardless of the total number N of the plurality of femtocells 5. Accordingly, by using formula (5) it becomes possible to prevent the uplink communication quality of the femtocell mobile station 2-1 from being reduced excessively due to the suppression of the uplink interference to the macro cell 6.

To be more specific, by using formula (5), the upper limit of the entire uplink interference at the macro base station 3 is a value which is determined by subtracting $\Gamma_{MIN}$ from the reception power $S_M$ of the uplink signal (desired wave) which reaches the macro mobile station 3 from the macro mobile station 4 irrespective of the number of units of the femtocell base station 1. Therefore, it is expected that the communication quality (i.e., SINR) of the uplink signal of the macro cell 6 is greater than $\Gamma_{MIN}$.

Note that a concept of Patent Literature 1 corresponds to that the uplink resource usage rate $U_{H,i}$ is set at 1 at all times with respect to the femtocell base station 1 which has the femtocell mobile station 2 engaged in connection, and that the uplink resource usage rate $U_{H,i}$ is set at 0 with respect to the femtocell base station 1 which does not have the femtocell mobile station 2 engaged in connection. On the other hand, the present embodiment is the same with Patent Literature 1 concerning that the uplink resource usage rate $U_{H,i}$ is set at 0 with respect to the femtocell base station 1 which does not have the femtocell mobile station 2 engaged in connection. However, according to the present embodiment, the uplink resource usage rate $U_{H,i}$ with respect to the femtocell base station 1 which has the femtocell mobile station 2 engaged in connection changes in accordance with the uplink resource usage amount, and is a value greater than 0 and smaller than or equal to 1. Because of this, the resource parameter R1 which reflects the sum of PRB usage rates is smaller with the present embodiment compared with that of the concept of Patent Literature 1. Therefore, according to the present embodiment, by using formula (5) it is possible to make the uplink target received power $P_{O\_H}$ greater compared with a situation where the concept of Patent Literature 1 is utilized. By this, according to the present embodiment, it is possible to set the uplink transmission power of the femtocell mobile station 2-1 higher than Patent Literature 1.

Figure 8:
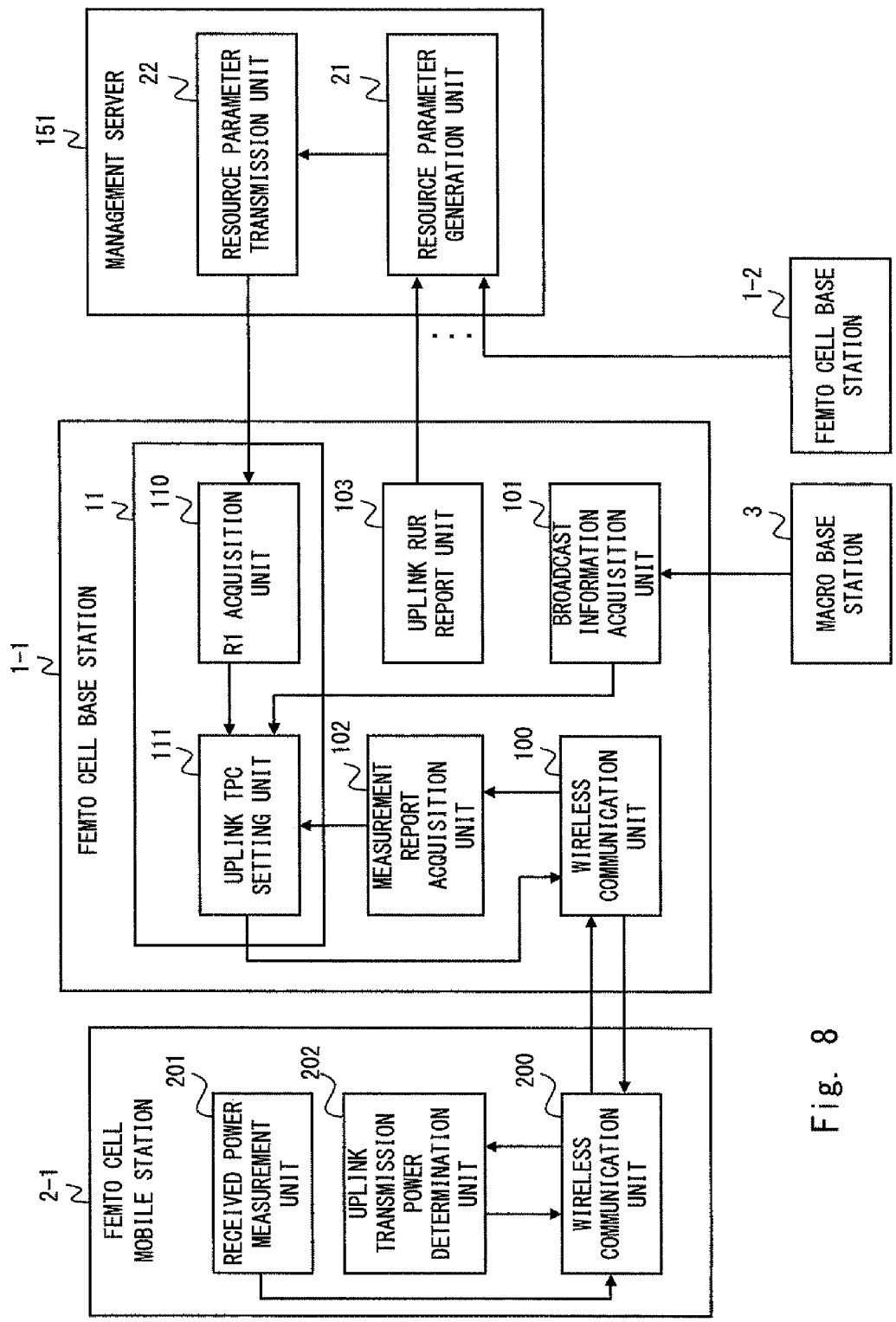
FIG. 8 is a diagram showing a configuration example of a wireless communication system according to a second embodiment of the present invention.

Next, hereinbelow, a configuration and an operation of the wireless communication system according to the present embodiment will be described. FIG. 8 is a block diagram illustrating a configuration example of the wireless communication system according to the present embodiment. As stated above, according to the present embodiment, the femtocell base station 1-1 has the feature of the transmission power control apparatus 10 (uplink transmission power control unit 11). The uplink transmission power control unit 11 shown in FIG. 8 includes an R1 acquisition unit 110 and an uplink TPC setting unit 111. The R1 acquisition unit 110 receives the resource parameter R1 from the resource parameter transmission unit 22 arranged at the management server 151. The uplink TPC setting unit 111 generates the uplink target received power $P_{O\_H}$ reflecting the resource parameter R1 and supplies the same to a wireless communication unit 100.

The wireless communication unit 100 transmits a downlink signal encoded with control data and user data to the femtocell mobile station 2-1. Further, the wireless communication unit 100 receives the uplink signal transmitted from the femtocell mobile station 2-1, and decodes reception data from the uplink signal. Further, the wireless communication unit 100 sends the uplink target received power $P_{O\_H}$ to the femtocell mobile station 2-1.

A broadcast information acquisition unit 101 receives in a wireless manner a broadcast signal, which is transmitted within the macro cell 6 by the macro base station 3. The broadcast information acquisition unit 101 restores broadcast information from the received broadcast signal, and acquires macro cell transmission power information included in the broadcast information. The macro cell transmission power information includes (1) the transmission power $P_{TX\_M}$ [dBm] of the downlink reference signal transmitted from the macro base station 3, (2) the uplink target received power $P_{O\_M}$ [dBm] used for determining the uplink transmission power at the macro mobile station 4, and (3) a correction coefficient $\alpha_M$ with respect to the propagation loss used for determining the uplink transmission power at the macro mobile station 4. The broadcast information acquisition unit 101 may carry out an acquisition operation of broadcast information via a Network Listening Mode (NLM) which is activated when initially setting the femtocell base station 1 or periodically (e.g., a few hours to 1 day) during the operation of the femtocell base station 1, for example.

A measurement report acquisition unit 102 receives from the femtocell mobile station 2-1 a measurement report which includes a measurement result of the received power (RSRP: Reference Signal Received Power) $P_{RX\_H}$ [dBm] of a downlink reference signal transmitted from the femtocell base station 1-1, and the received power $P_{RX\_M}$ [dBm] of the downlink reference signal transmitted from the macro base station 3.

An uplink RUR report unit 103 sends to the resource parameter generation unit 21 of the management server 151 the uplink PRB usage rate at the femtocell base station 1-1 as the uplink resource usage rate (uplink RUR). The uplink PRB usage rate may be defined as a ratio of PRB actually allocated to the mobile station 2-1 with respect to all uplink PRBs which are allocatable to the femtocell mobile station 2-1. The all uplink PRBs that are allocatable to the femtocell mobile station 2-1 are determined in a manner dependent on the frequency bandwidth (e.g., 10 MHz) applicable for uplink. The femtocell base station 1-1 may periodically (e.g., 100 millisecond, approximately) measure the uplink PRB usage rate to be reported to the management server 151. Further, the uplink PRB usage rate to be reported may be a moving average value, which is calculated using values measured at multiple occasions of periodical measurements. The uplink RUR report unit 103 may report the uplink PRB usage rate to the management server 151 using a report cycle (e.g., approximately 10 seconds) longer than the measuring cycle of the uplink PRB usage rate.

Next, the configuration example of the femtocell mobile station 2-1 will be described. Note that the configuration of the femtocell mobile station 2-1 illustrated in FIG. 8 is equivalent to the configuration of a general LTE mobile station. The wireless communication unit 200 transmits an uplink signal encoded with control data and user data to the femtocell base station 1-1. The wireless communication unit 200 receives a downlink signal transmitted from the femtocell base station 1-1, and decodes received data from the downlink signal. Further, the wireless communication unit 200 supplies to an uplink transmission power determination unit 202 the uplink target received power $P_{O\_H}$ received from the femtocell base station 1-1.

A received power measurement unit 201 measures the RSRP ($P_{RX\_H}$) of the femtocell base station 1-1, and the RSRP ($P_{RX\_M}$) of the macro base station 3. These measurements may be carried out periodically in a prescribed manner (e.g., 100 millisecond, approximately). The designation of base station (femtocell base station 1-1 and macro base station 3) and measurement item (RSRP) to be measured may be performed by the femtocell base station 1-1 by sending a measurement control message to the femtocell mobile station 2-1. Further, the received power measurement unit 201 reports the measurement result of the $P_{RX\_H}$ and $P_{RX\_M}$ to the femtocell base station 1-1 via the wireless communication unit 200. The report may be made periodically in a prescribed manner (e.g., 1 second, approximately). The measurement result of the $P_{RX\_H}$ and $P_{RX\_M}$ to be reported may include a value which is filtered using a predetermined weighting factor. Alternatively, the measurement result of the $P_{RX\_H}$ and $P_{RX\_M}$ to be reported may include a moving average value which is calculated using measured values from multiple measurements.

The uplink transmission power determination unit 202 determines the uplink transmission power $P_{UL,\ H}$ at the wireless communication unit 200 by using the uplink target received power $P_{O\_H}$ received from the femtocell base station 1-1. The uplink transmission power determination unit 202 may determine the uplink transmission power $P_{UL,\ H}$ in accordance with the above stated formula (3).

The operation of the resource parameter generation unit 21 and the transmission unit 22 arranged at the management server 151 is essentially the same as the operation which is described using FIG. 5 for the first embodiment of the present invention. The resource parameter transmission unit 22 may send the resource parameter R1 to the plurality of femtocell base stations 1 (e.g., base stations 1-1 and 1-2). It is preferable that the cycle in which the transmission unit 22 sends the resource parameter R1, that is, an updating cycle of the resource parameter R1, is an arbitrary cycle (e.g., 100 seconds, approximately) that is longer than the reporting cycle of the uplink resource usage rate from the plurality of femtocell base stations 1.

Figure 9:
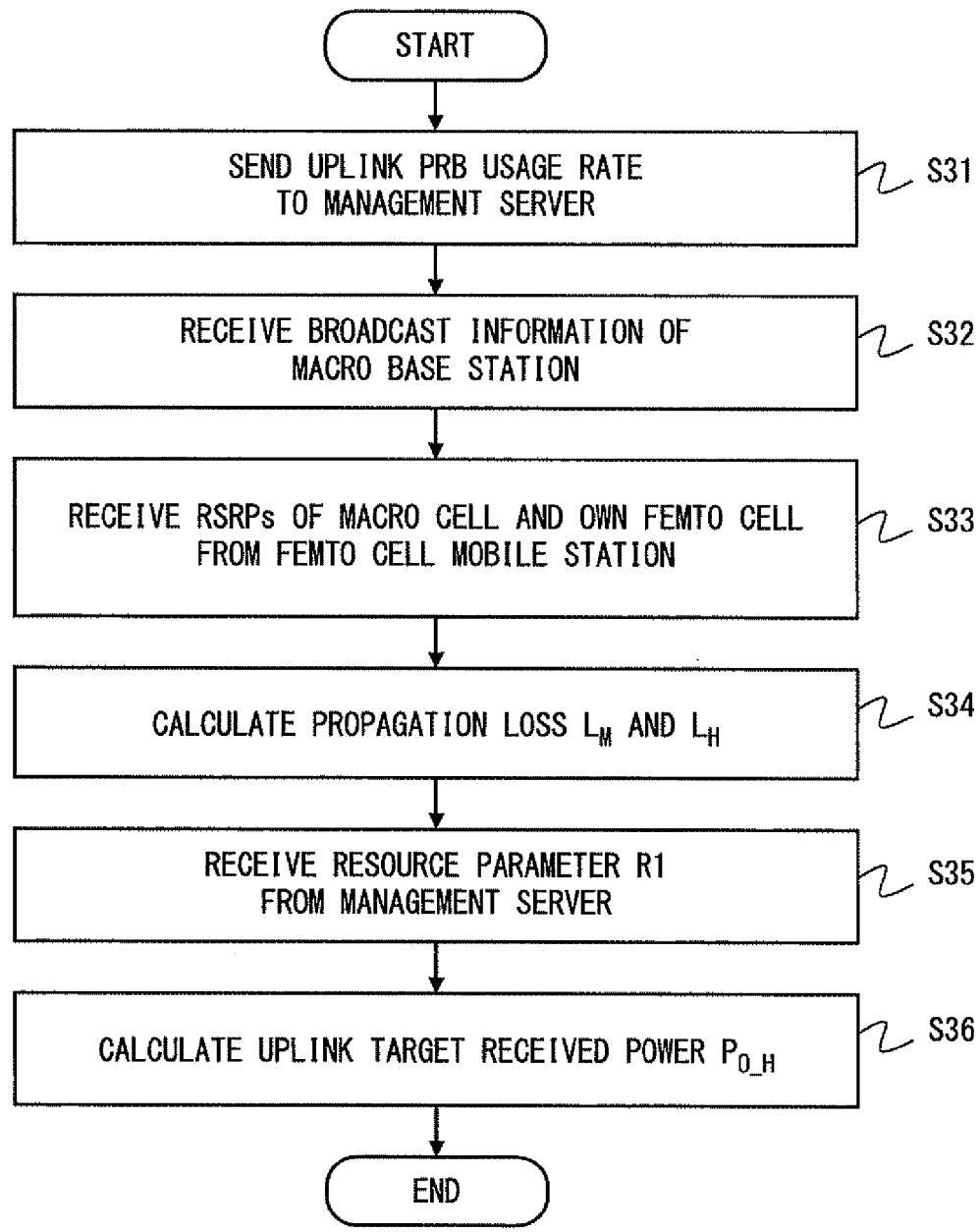
FIG. 9 is a flowchart showing a specific example of uplink transmission power control performed by a femtocell base station according to the second embodiment of the present invention.

FIG. 9 is a flowchart illustrating a specific example of the uplink transmission power control by the femtocell base station 1-1 according to the present embodiment. In Step S31, the femtocell base station 1-1 sends to the management server 151 the uplink PRB usage rate of the femtocell 5-1 managed thereby. In subsequent Steps S32 to S35, the parameter which is necessary for the calculation of uplink target received power $P_{O\_H}$ is acquired or generated by the above stated formula (5).

To be more specific, in Step S32, the femtocell base station 1-1 receives broadcast information transmitted from the macro base station 3, and acquires macro cell transmission power information included in the broadcast information. The macro cell transmission power information includes $P_{TX\_M}$, $P_{O\_M}$, and $\alpha_M$. In Step S33, the femtocell base station 1-1 receives from the femtocell mobile station 2-1 the RSRPs ($P_{RX\_M}$, $P_{RX\_H}$) of the macro cell 6 and the femtocell 5-1 managed thereby.

In Step S34, the femtocell base station 1-1 calculates the propagation loss $L_M$ between the macro base station 3 and the femtocell mobile station 2-1, and the propagation loss $L_H$ between the self (base station 1-1) and the femtocell mobile station 2-1. The propagation loss $L_M$ may be calculated via the difference between $P_{TX\_M}$ included in the macro cell transmission power information and RSRP ($P_{RX\_M}$) of the macro cell 6. Further, the propagation loss $L_H$ may be calculated via the difference between the own transmission power $P_{TX\_H}$ of the base station 1-1 and RSRP ($P_{RX\_H}$). Note that although $L_M$ and $L_H$ calculated herein include, strictly speaking, a downlink propagation loss, the same are used as the uplink propagation loss based on an assumption that there is no major difference between the loss characteristics of the uplink frequency and the downlink frequency.

In Step S35, the femtocell base station 1-1 receives the resource parameter R1 from the management server 151.

In Step S36, the femtocell base station 1-1 calculates the uplink target received power $P_{O\_H}$ in accordance with formula (5) using the values obtained via Steps S32 to S35.

Figure 10:
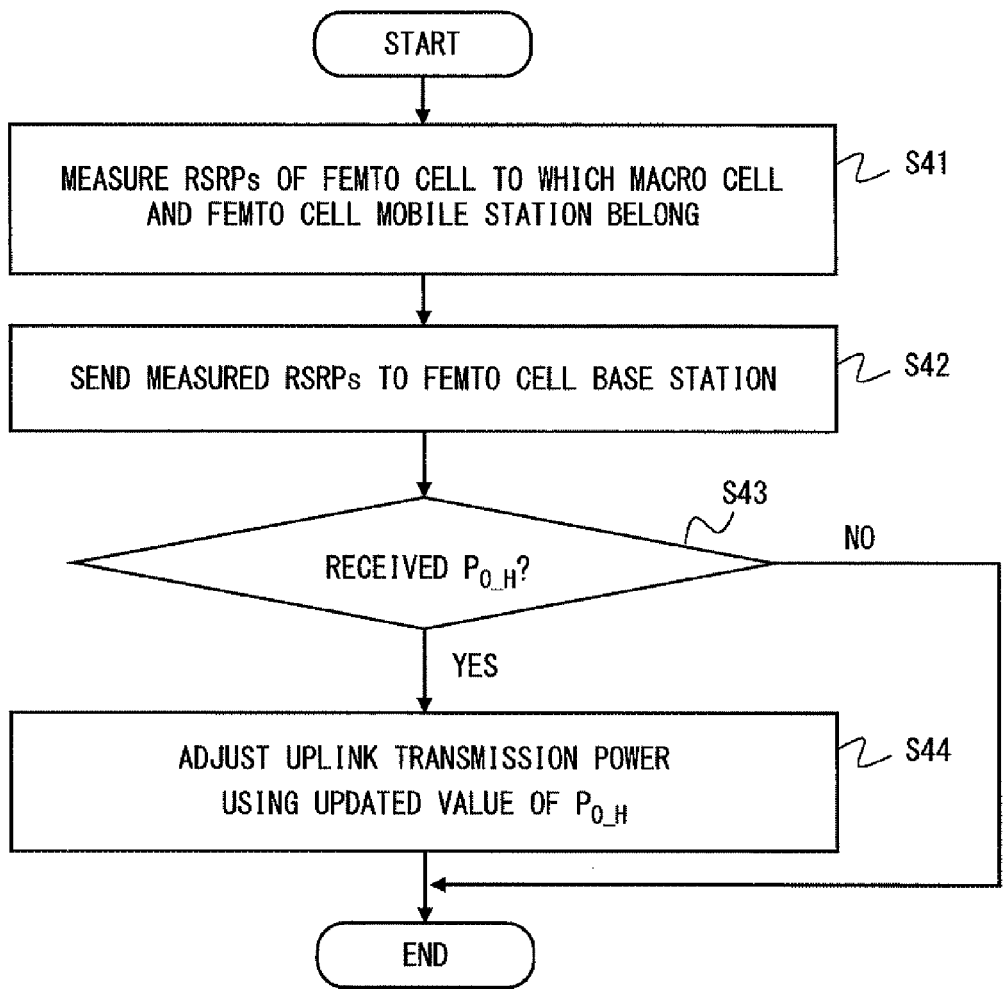
FIG. 10 is a flowchart showing a specific example of an operation performed by a femtocell base station according to the second embodiment of the present invention.

FIG. 10 is a flowchart illustrating a specific example of the operation of the femtocell mobile station 2-1. In Step S41, the femtocell mobile station 2-1 measures RSRPs ($P_{RX\_M}$ and $P_{RX\_H}$) of the macro cell 6 and the femtocell 5-1 to which the own femtocell mobile station 2-1 belong. In Step S42, the femtocell mobile station 2-1 sends the measurement result of RSRPs ($P_{RX\_M}$ and $P_{RX\_H}$) to the femtocell base station 1.

In Step S43, the femtocell mobile station 2-1 makes a determination as to whether or not an updated value of the uplink target received power $P_{O\_H}$ is received from the femtocell base station 1-1. When the updated value of the uplink target received power $P_{O\_H}$ is received, the femtocell mobile station 2-1 carries out an adjustment of the uplink transmission power $P_{UL,\ H}$ by using the updated value of the uplink transmission power $P_{UL,\ H}$ (Step S44). The adjustment of the uplink transmission power $P_{UL,\ H}$ may be carried out by calculating the updated value of the uplink transmission power $P_{UL,\ H}$ in accordance with formula (3) using the updated value of $P_{O\_H}$.

Figure 11:
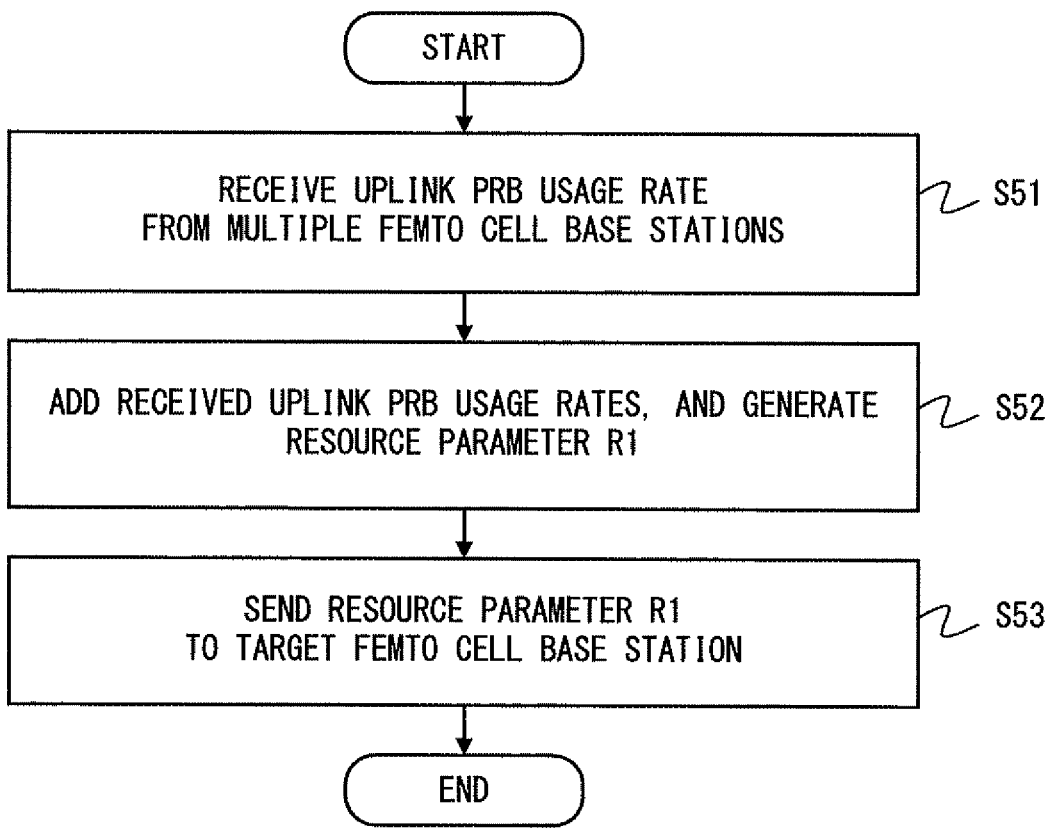
FIG. 11 is a flowchart showing a specific example of a procedure of providing a resource parameter performed by a management server according to the second embodiment of the present invention.

FIG. 11 is a flowchart illustrating a specific example of a supplying procedure of the resource parameter R1 by the management server 151. In Step S51, the management server 151 receives the uplink PRB usage rate of each femtocell 5 from each of the plurality of femtocell base stations 1. In Step S52, the management server 151 generates the resource parameter R1 by adding the plurality of uplink PRB usage rates of the plurality of femtocells 5. In Step S53, the management server 151 sends the resource parameter R1 to the target femtocell base station 1-1.

Third Embodiment

With this embodiment, a modification of the second embodiment will be described. With the present embodiment, while maintaining a condition via which an entire uplink interference quantity at the macro base station 3 is kept below a certain level, the control contents of the uplink transmission power for each femtocell 5 are differentiated in accordance with the usage amount or the usage rate of the uplink resources (PRBs) per femtocell 5. That is, the femtocell 5 having a large uplink resource usage amount or usage rate is operable to reduce the transmission power in a preferential manner compared with the femtocell 5 having a small uplink resource usage amount or usage rate.

To be more specific, according to the present embodiment, in order for the uplink transmission power control of the femtocell 5-1, a correction parameter $\Delta i$, in addition to the resource parameter R1, is used. As previously stated, the resource parameter R1 is a value which increases and decreases in accordance with the sum of the usage amounts or sum of the usage rates of the uplink resources in the plurality of femtocells 5. In contrast, the correction parameter $\Delta i$ is defined as a value which increases and decreases in accordance with the usage amount or usage rate of the uplink resources of the target femtocell 5-1 (i.e., not the sum of them across the plurality of femtocells). Further, the correction parameter $\Delta i$ is determined such that the sum of a plurality of $\Delta i$ across the plurality of femtocells 5 is substantially constant.

First, a specific example of a calculation method of the correction parameter $\Delta i$ [dB] will be described. Here, an example in which the uplink target received power $P_{O\_H}$ at the femtocell base station 1 is determined taking into account the resource parameter R1 and the correction parameter $\Delta i$ in order for the uplink transmission power control of the femtocell 5 will be described. Since the $\Delta i$ is added to the uplink target received power $P_{O\_H}$, the uplink interference power $I_H$, which is caused by the femtocell mobile station 2-1 to the macro base station 3, is changed by $\Delta i$. Therefore, assuming that the entire uplink interference power in formula (1) reaches its upper limit (i.e., when equality is satisfied), the uplink interference power $I_H$ is expressed via the following formula (6).

[Formula 6]

$$I_H = S_M - \Gamma_{MIN} - 10 \log_{10} R1 + \Delta_i \quad (6)$$

It is to be noted that following restrictions are imposed on $\Delta i$. First, in order to maintain the uplink communication quality of the macro mobile station 4, an entire uplink interference power caused to the macro base station 3 must be kept unchanged before and after the addition of $\Delta i$. Therefore, a result of adding $I_H$ of formula (6) to an entirety of the plurality of femtocell base stations 1 must be equal to a result before $\Delta i$ is added. Accordingly, when the entire uplink interference power caused to the macro base station 3 is unchanged, the following formula (7) is established.

[Formula 7]

$$\sum_{i=1}^{N} 10^{(S_M - \Gamma_{MIN} + \Delta_i - 10\log_{10} R1)/10} = 10^{(S_M - \Gamma_{MIN})/10} \Rightarrow \sum_{i=1}^{N} 10^{\Delta_i/10} = R1 \quad (7)$$

Next, $\Delta i$ is determined as a monotonic decreasing function of the uplink PRB usage rate $U_{H,i}$. This is intended to keep the uplink interference caused to the macro base station 3 equal among the plurality of femtocells 5 regardless of the uplink PRB usage rate of each of the femtocell 5. That is, the femtocell 5 having a large uplink resource usage amount or usage rate is operable to reduce the transmission power in a preferential manner compared with the femtocell 5 having a small uplink resource usage amount or usage rate.

One of the simplest examples of the monotonic decreasing function is a linear function in which when $U_{H,i}$ is 0, which is the minimum value thereof, $\Delta i$ is the maximum value $\Delta$max, while when $U_{H,i}$ is 1, which is the maximum value thereof, $\Delta i$ is the minimum value $-\Delta$max. In such case, $\Delta i$ is formulated as formula (8). $\Delta$max is calculated by substituting formula (8) for formula (7). Note, however, formula (8) is merely an example, and when the condition is met such that $\Delta i$ satisfies formula (7) and is the monotonic decreasing function, the formulation of $\Delta i$ may be arbitrarily defined.

[Formula 8]

$$\Delta_i = \Delta\text{max} \cdot (1 - 2 U_{H,i}) \quad (8)$$

When the resource parameter R1 and the correction parameter $\Delta i$ are used, the uplink target received power $P_{O\_H}$ is formulated as formula (9), for example.

[Formula 9]

$$P_{O\_H} = P_{O\_M} - \Gamma_{MIN} + \alpha_M L_M - \alpha_H L_H - 10 \log_{10} R1 + \Delta_i \quad (9)$$

According to the present embodiment, it is possible to change the calculation formula of the uplink target received power $P_{O\_H}$ per femtocell base station 1 in accordance with the uplink PRB usage rate of each femtocell 5 while maintaining the condition that the entire uplink interference quantity caused to the macro base station 3 by the plurality of femtocells 5 arranged in an overlapping manner within the macro cell 6 is kept below a certain level. That is, the femtocell 5 having a large uplink resource usage amount or usage rate is operable to reduce the transmission power in a preferential manner compared with the femtocell 5 having a small uplink resource usage amount or usage rate.

Figure 12:
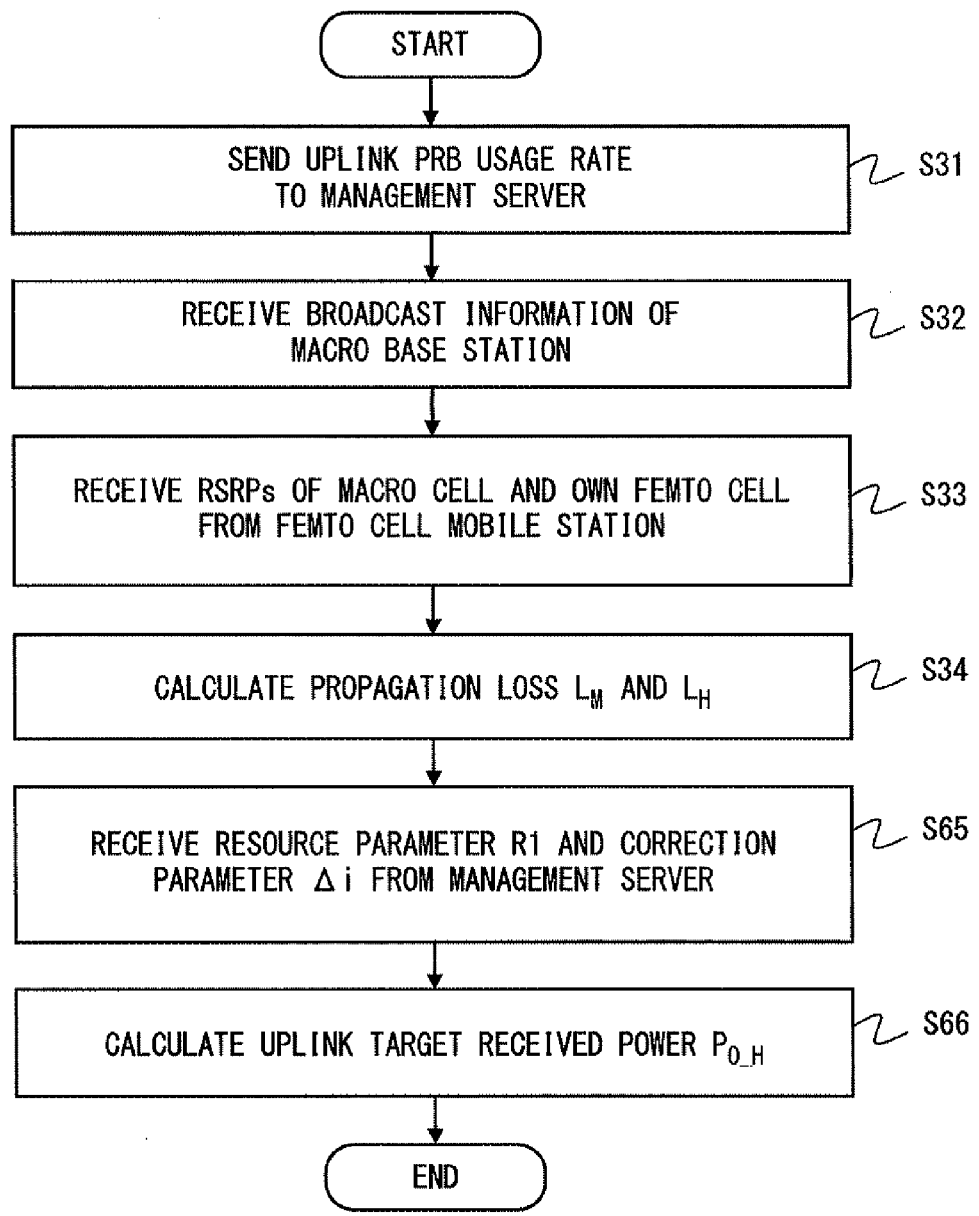
FIG. 12 is a flowchart showing a specific example of an operation performed by a femtocell base station according to a third embodiment of the present invention.

FIG. 12 is a flowchart illustrating a specific example of the uplink transmission power control of the femtocell base station 1-1 according to the present embodiment. Steps S31 to S34 illustrated in FIG. 12 are the same as Steps S31 to S34 illustrated in FIG. 9. In Step S65 of FIG. 12, the femtocell base station 1-1 receives the resource parameter R1 and the correction parameter $\Delta i$ from the management server 151. In Step S66, the femtocell base station 1-1 calculates the uplink target received power $P_{O\_H}$ in accordance with formula (9) using the value obtained in Step S65.

Figure 13:
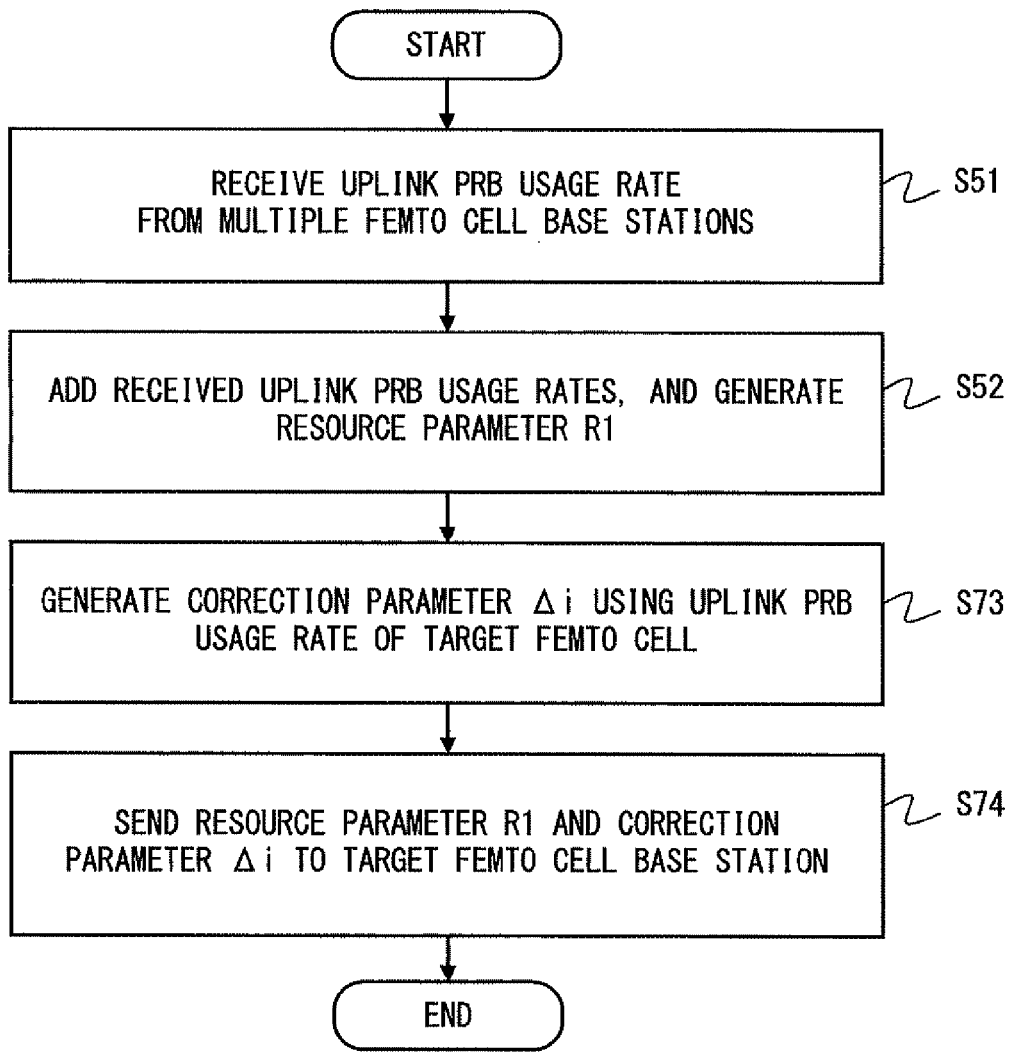
FIG. 13 is a flowchart showing a specific example of a procedure of providing a resource parameter and a correction parameter performed by a management server according to the third embodiment of the present invention.

FIG. 13 is a flowchart illustrating a specific example of the supplying procedure of the resource parameter R1 and the correction parameter $\Delta i$ by the management server 151. Steps S51 to S52 illustrated in FIG. 13 are the same as Steps S51 to S52 illustrated in FIG. 11. In Step S73, the management server 151 generates the correction parameter $\Delta i$ in accordance with formulas (7) and (8), for example. In Step S74, the management server 151 sends the resource parameter R1 and the correction parameter $\Delta i$ to the target femtocell base station 1-1.

Fourth Embodiment

With this embodiment, a specific example of the first embodiment will be described. According to the present embodiment, an example in which the feature of the transmission power control apparatus 10 and that of the parameter providing apparatus 20 are arranged at the femtocell base station 1 will be described. That is, the plurality of femtocell base stations 1 mutually exchange the usage amount or usage rate of the uplink resources (PRBs) thereof. It is preferable that, in order to send and receive the usage amount or usage rate of the uplink resources (PRBs) among the plurality of base stations 1, a communication interface operable to be used between the base stations, such as X2 interface which is standardized 3GPP is used.

Figure 14:
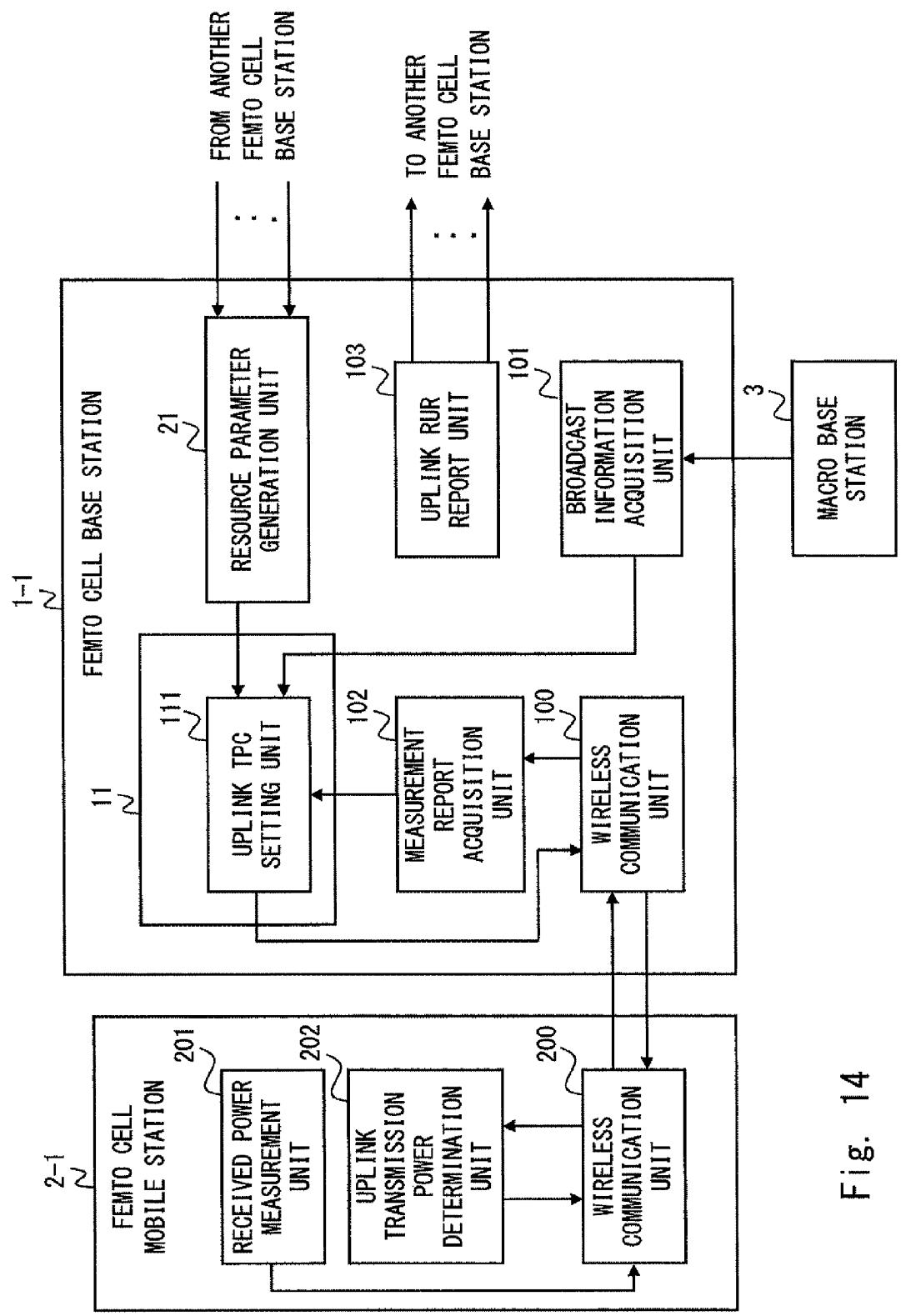
FIG. 14 is a diagram showing a configuration example of a wireless communication system according to a fourth embodiment of the present invention.

FIG. 14 is a block diagram illustrating a configuration example of the wireless communication system according to the present embodiment. The femtocell base station 1-1 includes the features of the transmission power control apparatus 10 (uplink transmission power control unit 11) and the parameter providing apparatus 20 (resource parameter generation unit 21). The resource parameter generation unit 21 receives the uplink PRB usage rate of each femtocell 5, not from the management server 151, but from another femtocell base station 1 so as to generate the resource parameter R1.

The uplink transmission power control unit 11 illustrated in FIG. 14 includes the uplink TPC setting unit 111. The uplink TPC setting unit 111 generates an uplink target received power $P_{O\_H}$ to which the resource parameter R1 generated by the generation unit 21 is applied, and supplies the same to the wireless communication unit 100. Further, the uplink RUR report unit 103 illustrated in FIG. 14 sends the uplink PRB usage rate of the femtocell 5-1 to another femtocell base station 1, not to the management server 151.

Figure 15:
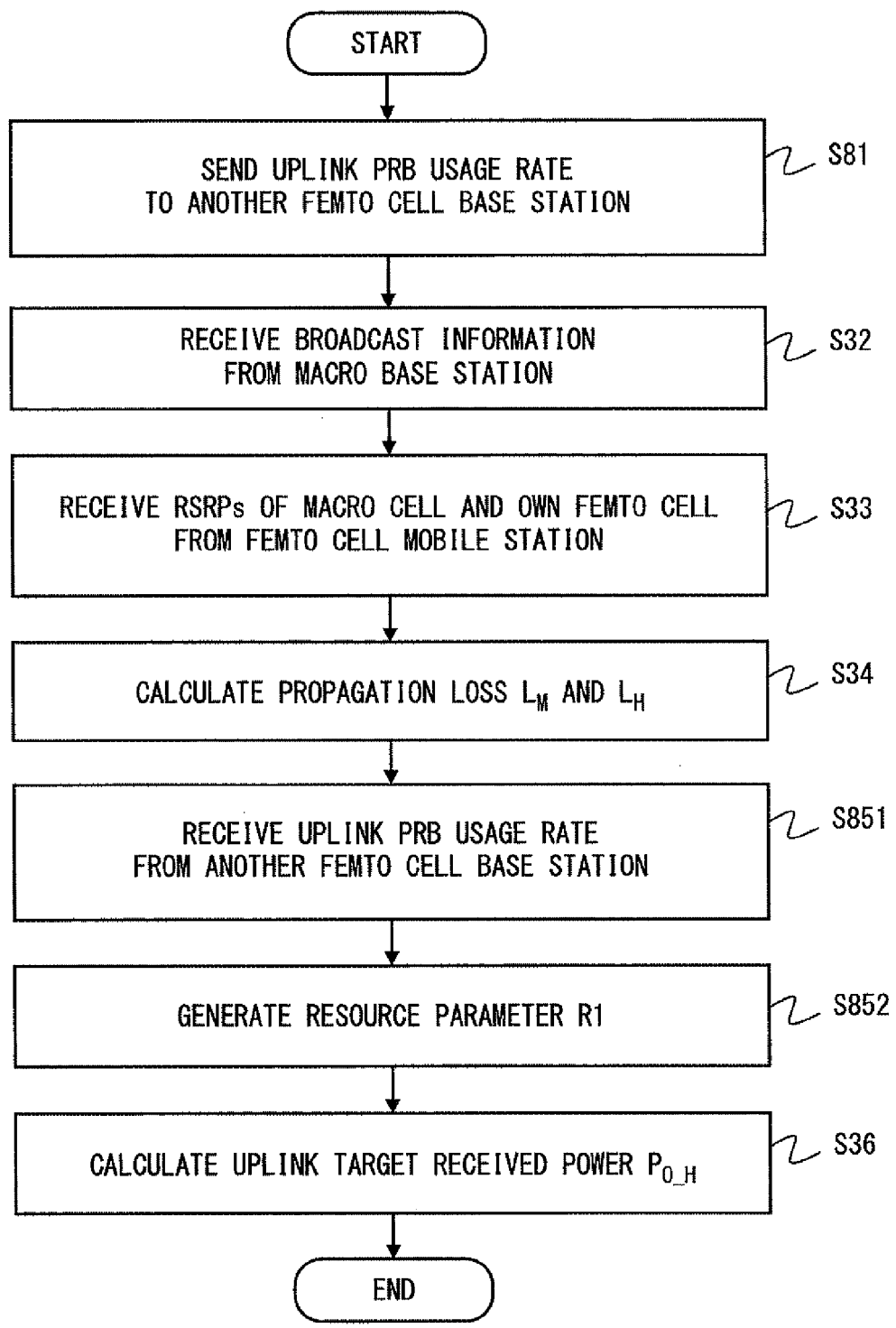
FIG. 15 is a flowchart showing a specific example of uplink transmission power control performed by a femtocell base station according to the fourth embodiment of the present invention.

FIG. 15 is a flowchart illustrating a specific example of the uplink transmission power control by the femtocell base station 1-1 according to the present embodiment. Steps S32 to S34 and S36 illustrated in FIG. 15 are the same as Steps S32 to S34 and S36 illustrated in FIG. 9. In Step S81 of FIG. 15, the femtocell base station 1-1 sends the uplink PRB usage rate thereof, i.e., the cell 5-1, to each of other femtocell base stations 1. In Step S851, the femtocell base station 1-1 receives the uplink PRB usage rate from each of other femtocell base stations 1. In Step S852, the femtocell base station 1-1 generates the resource parameter R1 by adding the uplink PRB usage rates of other femtocells 5 and the uplink PRB usage rate thereof, i.e., the cell 5-1.

According to the present embodiment, information concerning the resource usage amount or usage rate of the uplink resource is exchanged among the plurality of femtocell base stations 1. Therefore, the present embodiment is beneficial in that the management server 151 is unnecessary.

Another Embodiment A

In the second and third embodiments, an exemplary configuration in which one management server 151 is arranged with respect to one macro cell 6 is described. However, it is to be noted that the number of the management server 151 with respect to each macro cell 6 is not necessarily limited to 1. For example, the management server 151 may perform supply of the resource parameter R1 regarding the plurality of macro cells 6 and the plurality of femtocells 5 overlapping therewith. In such case, the number of the management server 151 per macro cell 6 is less than 1. On the other hand, there are possibly occasions where the number of the management server 151 per macro cell 6 is greater than 1. In such case, a set of femtocell base stations 1 managed by one management server 151 becomes a part of the plurality of femtocell base stations 1 arranged within the macro cell 6. In order to grasp the uplink interfere from the entire femtocell base stations 1 within the macro cell 6, the resource parameter R1 may be exchanged among the plurality of management servers 151.

Another Embodiment B

In the second and third embodiments, an exemplary arrangement in which the parameter providing apparatus 20 is arranged at the management server 151 is given. However, the parameter providing apparatus 20 may be arranged at another apparatus. For example, in the wireless communication system of LTE, the parameter providing apparatus 20 may be arranged at an OAM (Operating & Maintenance) server which corresponds to the management server 151, or at MME (Mobility Management Entity), S-GW (Serving Gateway), or HeNB GW. Further, in a wireless communication system of W-CDMA, the parameter providing apparatus 20 may be arranged at HNB GW, or arranged at RNC.

Another Embodiment C

In the fourth embodiment, an example in which information concerning the usage amount or usage rate of the uplink resources is exchanged among the plurality of femtocell base stations 1 is provided. In such example, the plurality of femtocell base stations 1 are equal to one another. However, the plurality of femtocell base stations 1 each are not necessarily required to be equal to one another in that at least one femtocell base station 1 is arranged in advance within the macro cell 6 as an anchor, for example. In this case, each femtocell base station 1 may report the usage amount or usage rate of the resources to the anchor femtocell base station 1. Further, the anchor femtocell base station 1 may generate, in a manner similar to the management server 151, the resource parameter R1, and inform each femtocell base station of the same. It is preferable that the role of the anchor is carried out routinely by a specified femtocell base station 1, or by the plurality of femtocell base stations 1 in an alternate manner via a predetermined cycle.

Another Embodiment D

In the second to fourth embodiments, an example in which the number of the femtocell mobile station 2 connected to the femtocell base station 1 is described. However, the number of the femtocell mobile station 2 connected to the femtocell base station 1 may be plural. In such case, firstly the femtocell base station 1 may calculate the uplink target received power $P_{O\_H}$ via any one of the second to fourth embodiments for each femtocell mobile station 2. In LTE, in general, the uplink target received power $P_{O\_H}$ is set per mobile station by adding a correction for each mobile station to a standard value of the uplink target received power for each cell. Therefore, it is preferable that the femtocell base station 1, then, calculates an average value (or median) of the uplink target received power which is commonly applied to the plurality of femtocell mobile stations 2, and calculates the difference with respect to the average value as the correction for each femtocell mobile station. Finally, it is preferable that the femtocell base station 1 sends the calculated average value and the difference to each femtocell mobile station 2. Note that the femtocell base station 1 may send, to each femtocell mobile station 2, only the average value as the uplink target received power which is common among the plurality of femtocell mobile stations 2.

Another Embodiment E

In the first to fourth embodiments, a HetNet environment in which the macro cell and the plurality of femtocells are arranged in an overlapping manner is described. However, an application of present invention is not limited to an environment which includes the macro cell and the plurality of femtocells. For example, it may be an environment in which a macro cell and a plurality of picocells each having a communication area greater than that of the femtocell are arranged in a mixed manner. In such case, the uplink transmission power control described for the first to fourth embodiments of the present invention may be applied for the uplink transmission power control of a picocell. Further, a picocell base station may acquire necessary information from the macro base station using an inter base station interface (e.g., X2 interface) regardless of the broadcast information from the macro base station. Further, the present invention may be applied to an arbitrary HetNet environment, not only the mixed environment including macrocell and picocell, but also a mixed environment including macrocell, picocell and femtocell, or a mixed environment including macro cell and micro cell.

Another Embodiment F

In the second to fourth embodiments, an example in which the resource parameter R1 is applied to the uplink target received power $P_{O\_H}$ is described. However, as described with the first embodiment, the target to which the resource parameter R1 is applied for the uplink transmission power control of the femtocell 5 is not limited to the uplink target received power $P_{O\_H}$. For example, the resource parameter R1 may be applied to the maximum transmission power $P_{MAX,\ H}$ of the femtocell mobile station 2. By adjusting the uplink maximum transmission power $P_{MAX,\ H}$ based on the resource parameter R1, it becomes possible to keep the uplink interference caused to the macro base station 3 below the maximum acceptable value in a stable manner even when the change in the uplink transmission power of the femtocell mobile station 2 is large.

When it is assumed that the macro mobile station 4 and the femtocell mobile station 2-1 carry out a transmission at their respective maximum transmission power, formulas (4-1) and (4-2) may be replaced as the following formulas (10-1) and (10-2). Here, $P_{MAX,\ M}$ [dBm] is the uplink maximum transmission power of the macro mobile station 4.

[Formula 10]

$$S_M = P_{MAX,M} - L_M \quad (10\text{-}1)$$

$$I_H = P_{MAX,H} - L_M \quad (10\text{-}2)$$

In the same manner as described for the second embodiment, the uplink maximum transmission power $P_{MAX,\ H}$ of the femtocell mobile station 2-1 may be formulated as formula (11) by substituting formula (10-1) and formula (10-2) for formula (1). Note that a value (e.g., 23 dBm) standardized in 3GPP as the maximum transmission power for a mobile station may be used for $P_{MAX,\ H}$.

[Formula 11]

$$P_{MAX,H} = P_{MAX,M} - \Gamma_{MIN} - 10\ \text{Log}_{10} R1 \quad (11)$$

Another Embodiment G

In the second to fourth embodiments, an example in which all of the plurality of femtocell base stations 1 which are arranged within the macro cell 6 report on the uplink resource usage rate is described. However, only a portion of the plurality of femtocell base stations 1 arranged within the macro cell 6 may report on the resource usage rate. For example, of the plurality of femtocell base stations 1 arranged within the macro cell 6 only the femtocell base station 1 that is activated may report on the uplink resource usage rate. Note that the femtocell base station 1 does not necessarily need to be activated at all times, in that when a user is not present the femtocell base station 1 may be deactivated, for example. However, it is often the case that in order to detect the presence of a user (mobile station 2) and automatically activate the femtocell base station 1 after it is deactivated, the reception feature remains activated.

Further, for example, of the plurality of femtocell base stations 1 arranged within the macro cell 6 only the femtocell base station 1 which is in communication with the femtocell mobile station 2-1 may report on the uplink resource usage rate.

Another Embodiment H

In the third embodiment, an example in which the correction parameter Δi is determined as a monotonic decreasing function of the uplink PRB usage rate $U_{H,\ i}$ is described. However, the correction parameter Δi may also be determined as a monotonic increasing function of $U_{H,\ i}$. This is because, with respect to the femtocell mobile station 2 having a high uplink PRB usage rate and a high communication load, it is intended to increase the uplink communication quality of the femtocell mobile station 2 by increasing the uplink target received power. One of the simplest examples regarding the monotonic increasing function is a linear function in which when $U_{H,\ i}$ is 0, which is the minimum value thereof, Δi is the minimum value −Δmax, while when $U_{H,\ i}$ is 1, which is the maximum value thereof, Δi is the maximum value Δ max. In such case, Δi is formulated as formula (12). Note, however, formula (12) is merely an example, and when the condition is met such that Δi satisfies formula (7) and is the monotonic increasing function, the formulation of Δi may be arbitrarily defined.

[Formula 12]

$$\Delta_i = \Delta\max \cdot (2U_{H,i} - 1) \quad (12)$$

Another Embodiment I

In the second to fourth embodiments, a case where the present invention is applied to the wireless communication system of LTE (E-UTRA) scheme is described. However, as described with the first embodiment, the wireless communication system to which the present invention is applied is not particularly limited. For example, the present invention is applicable to W-CDMA system, or a wireless communication system (e.g., WiMAX, IEEE 802.16m) which utilizes TDD (Time Division Duplex) scheme which uses an identical wireless frequency in a time-division manner for an uplink and a downlink.

Another Embodiment J

The operations by the transmission power control apparatus 10 and the parameter providing apparatus 20 as described for the first to fourth embodiments of the present invention may be implemented by using a semiconductor processing apparatus which includes ASIC (Application Specific Integrated Circuit), DSP (Digital Signal Processor) or the like. Further, these apparatuses may be implemented by having a computer such as a microprocessor, or the like, to execute programs. To be more specific, it is preferable that a program, which includes instructions for the computer to execute the algorithm illustrated in FIGS. 6, 7, 9, 11, 12, 13 and 15, is created and the program is supplied to the computer.

This program may be stored by using various types of non-transitory computer readable mediums, and supplied to the computer. The non-transitory computer readable medium includes various types of tangible storage mediums. Examples of the non-transitory computer readable medium include a magnetic recording medium (such as a flexible disk, a magnetic tape, and a hard disk drive), a magneto-optic recording medium (such as a magneto-optic disk), a CD-ROM (Read Only Memory), a CD-R, and a CD-R/W, and a semiconductor memory (such as a mask ROM, a PROM (Programmable ROM), an EPROM (Erasable PROM), a flash ROM, and a RAM (Random Access Memory)). Further, the program may be supplied to computers by using various types of transitory computer readable media. Examples of the transitory computer readable media include an electrical signal, an optical signal, and an electromagnetic wave. The transitory computer readable media may be used to supply programs to computer through a wire communication path such as an electrical wire and an optical fiber, or wireless communication path.

The above-described embodiments can be combined as appropriate. Furthermore, the invention is not limited to the embodiments described above, and it will be obvious that various modifications may be made therein without departing from the spirit and scope of the present invention described above.

This application is based upon and claims the benefit of priority from Japanese Patent Application No. 2012-7103, filed on Jan. 17, 2012, the disclosure of which is incorporated herein in its entirety by reference.

REFERENCE SIGNS LIST 1, 1-1, 1-2 FEMTOCELL BASE STATION
2, 2-1, 2-2 FEMTOCELL MOBILE STATION
3 MACRO BASE STATION
4 MACRO MOBILE STATION
5, 5-1, 5-2 FEMTOCELL
6 MACRO CELL
10 TRANSMISSION POWER CONTROL APPARATUS
11 UPLINK TRANSMISSION POWER CONTROL UNIT
20 PARAMETER PROVIDING APPARATUS
21 RESOURCE PARAMETER GENERATION UNIT
22 RESOURCE PARAMETER TRANSMISSION UNIT
100 WIRELESS COMMUNICATION UNIT
101 BROADCAST INFORMATION ACQUISITION UNIT
102 MEASUREMENT REPORT ACQUISITION UNIT
103 UPLINK RUR REPORT UNIT
110 RESOURCE PARAMETER (R1) ACQUISITION UNIT
111 UPLINK TPC SETTING UNIT
150 UPPER NETWORK
151 MANAGEMENT SERVER
200 WIRELESS COMMUNICATION UNIT
201 RECEIVED POWER MEASUREMENT UNIT
202 UPLINK TRANSMISSION POWER DETERMINATION UNIT

The invention claimed is:

1. A wireless communication system comprising:
a first base station that forms a first cell;
a plurality of second base stations that form a plurality of second cells each having an area smaller than that of the first cell and each including a portion thereof partially overlapping with the first cell;
a control apparatus configured to execute uplink transmission power control for a target cell included in the plurality of second cells by using a resource parameter which increases and decreases in accordance with a sum of usage amounts or sum of usage rates of uplink resources in the plurality of second cells, wherein
the control apparatus executes the uplink transmission power control by further using a correction parameter defined as a monotonic increasing or decreasing function of a usage quantity or usage rate of uplink resources in the target cell, and
the correction parameter is determined to keep a sum across the plurality of second cells substantially constant.

2. The wireless communication system according to claim 1, wherein the resource parameter is determined to reduce an uplink transmission power of a mobile station belonging to the target cell when the sum of the usage quantities or the sum of the usage rates increases.

3. The wireless communication system according to claim 1, wherein the resource parameter includes a parameter depending on the sum of the usage rates.

4. The wireless communication system according to claim 1, wherein the resource parameter includes (a) the sum of the usage rates, or (b) an average value of the sum of the usage rates and the number of the plurality of second cells.

5. The wireless communication system according to claim 1, wherein the resource parameter is defined as a monotonic function of the sum of the usage amounts or the sum of the usage rates.

6. The wireless communication system according to claim 1, wherein the control apparatus executes the uplink transmission power control by further using a first loss parameter representing a propagation loss between the first cell and the target cell.

7. The wireless communication system according to claim 6, wherein the first loss parameter is defined as a propagation loss between the first base station and a mobile station belonging to the target cell.

8. The wireless communication system according to claim 1, wherein the control apparatus executes the uplink transmission power control by further using a parameter indicating an acceptable power level of uplink interference at the first base station.

9. The wireless communication system according to claim 8, wherein the uplink transmission power control includes controlling to keep uplink interference to the first base station caused by an uplink signal transmitted from a mobile station belonging to the target cell below the acceptable power level.

10. The wireless communication system according to claim 1, wherein the uplink transmission power control includes an adjustment of a target received power, at a target base station forming the target cell, of an uplink signal transmitted from a mobile station belonging to the target cell.

11. The wireless communication system according to claim 1, wherein the uplink transmission power control includes an adjustment of a maximum value of an uplink transmission power of a mobile station belonging to the target cell.

12. The wireless communication system according to claim 1 further comprising a supply apparatus configured to collect a usage quantity or a usage rate of resources in each second cell, generating the resource parameter, and supplying the resource parameter to the control apparatus.

13. The wireless communication system according to claim 12, wherein
the supply apparatus is arranged at a control apparatus operable to communicate with the plurality of second base stations, and
the control apparatus is arranged at each of the plurality of second base stations.

14. The wireless communication system according to claim 12, wherein
the supply apparatus is arranged at least one of the plurality of second base stations, and
the control apparatus is arranged at each of the plurality of second base stations.

15. The wireless communication system according to claim 10, wherein the uplink transmission power control includes informing a plurality of mobile stations belonging to the target cell about an average value of the target received power applied to the plurality of mobile stations.

16. The wireless communication system according to claim 10, wherein the uplink transmission power control includes informing each of a plurality of mobile stations belonging to the target cell about an average value of the target received power and a difference, per mobile station, with respect to the average value of the target received power.

17. The wireless communication system according to claim 1, wherein each of the plurality of second base stations is a base station having been activated so as to communicate with a mobile station.

18. The wireless communication system according to claim 1, wherein each of the plurality of second base stations is a base station which is in communication with a mobile station.

19. A transmission power control apparatus used in a wireless communication system including a first base station that forms a first cell, and a plurality of second base stations that form a plurality of second cells each having an area smaller than that of the first cell and each including a portion thereof partially overlapping with the first cell,
the transmission power control apparatus comprising:
a memory that stores instructions; and
at least one hardware processor configured to execute the instructions to perform uplink transmission power control for a target cell included in the plurality of second cells by using a resource parameter which increases and decreases in accordance with a sum of usage amounts or sum of usage rates of uplink resources in the plurality of second cells, wherein
the at least one hardware processor configured to execute the instructions to perform the uplink transmission power control by further using a correction parameter defined as a monotonic increasing or decreasing function of a usage quantity or usage rate of uplink resources in the target cell, and
the correction parameter is determined to keep a sum across the plurality of second cells substantially constant.

20. The transmission power control apparatus according to claim 19, wherein the resource parameter is determined to reduce an uplink transmission power of a mobile station belonging to the target cell when the sum of the usage quantities or the sum of the usage rates increases.

21. The transmission power control apparatus according to claim 19, wherein the resource parameter includes a parameter depending on the sum of the usage rates.

22. The transmission power control apparatus according to claim 19, wherein the resource parameter includes (a) the sum of the usage rates, or (b) an average value of the sum of the usage rates and the number of the plurality of second cells.

23. The transmission power control apparatus according to claim 19, wherein the resource parameter is defined as a monotonic function of the sum of the usage amounts or the sum of the usage rates.

24. The transmission power control apparatus according to claim 19, wherein the at least one hardware processor configured to execute the instructions performs the uplink transmission power control by further using a first loss parameter representing a propagation loss between the first cell and the target cell.

25. The transmission power control apparatus according to claim 24, wherein the first loss parameter is defined as a propagation loss between the first base station and a mobile station belonging to the target cell.

26. The transmission power control apparatus according to claim 19, wherein the at least one hardware processor configured to execute the instructions performs the uplink transmission power control by further using a parameter indicating an acceptable power level of uplink interference at the first base station.

27. The transmission power control apparatus according to claim 26, wherein the uplink transmission power control includes controlling to keep uplink interference to the first base station caused by an uplink signal transmitted from a mobile station belonging to the target cell below the acceptable power level.

28. The transmission power control apparatus according to claim 19, wherein the uplink transmission power control includes an adjustment of a target received power, at a target base station forming the target cell, of an uplink signal transmitted from a mobile station belonging to the target cell.

29. The transmission power control apparatus according to claim 19, wherein the uplink transmission power control includes an adjustment of a maximum value of an uplink transmission power of a mobile station belonging to the target cell.

30. The transmission power control apparatus according to claim 28, wherein the uplink transmission power control includes informing a plurality of mobile stations belonging to the target cell about an average value of the target received power applied to the plurality of mobile stations.

31. The transmission power control apparatus according to claim 28, wherein the uplink transmission power control includes informing each of a plurality of mobile stations belonging to the target cell about an average value of the target received power and a difference, per mobile station, with respect to the average value of the target received power.

32. The transmission power control apparatus according to claim 19, wherein each of the plurality of second base stations is a base station having been activated so as to communicate with a mobile station.

33. The transmission power control apparatus according to claim 19, wherein each of the plurality of second base stations is a base station which is in communication with a mobile station.

34. A base station apparatus comprising:
the transmission power control apparatus according to claim 19; and
a wireless transceiver configured to communicate with a mobile station belonging to the target cell.

35. A parameter providing apparatus used in a wireless communication system including a first base station that forms a first cell, a plurality of second base stations that form a plurality of second cells each having an area smaller than that of the first cell and each including a portion thereof partially overlapping with the first cell, and a control apparatus that executes uplink transmission power control for a target cell included in the plurality of second cells formed by the plurality of second base stations,
the parameter providing apparatus comprising:
a memory that stores instructions; and
at least one hardware processor configured to execute the instructions to collect a usage quantity or a usage rate of resources in each second cell, generate a resource parameter to be used in the uplink transmission power control, and supply the resource parameter to the control apparatus, the resource parameter increasing and decreasing in accordance with a sum of usage amounts or sum of usage rates of uplink resources in the plurality of second cells.

36. A transmission power control method used in a wireless communication system including a first base station that forms a first cell and a plurality of second base stations that form a plurality of second cells each having an area smaller than that of the first cell and each including a portion thereof partially overlapping with the first cell, the method comprising executing uplink transmission power control for a target cell included in the plurality of second cells by using a resource parameter which increases and decreases in accordance with a sum of usage amounts or sum of usage rates of uplink resources in the plurality of second cells, wherein the executing includes executing the uplink transmission power control by further using a correction parameter defined as a monotonic increasing or decreasing function of a usage quantity or usage rate of uplink resources in the target cell, and the correction parameter is determined to keep a sum across the plurality of second cells substantially constant.

37. The transmission power control method according to claim 36, wherein the resource parameter is determined to reduce an uplink transmission power of a mobile station belonging to the target cell when the sum of the usage quantities or the sum of the usage rates increases.

38. The transmission power control method according to claim 36, wherein the resource parameter includes a parameter depending on the sum of the usage rates.

39. The transmission power control method according to claim 36, wherein the resource parameter includes (a) the sum of the usage rates, or (b) an average value of the sum of the usage rates and the number of the plurality of second cells.

40. The transmission power control method according to claim 36, wherein the resource parameter is defined as a monotonic function of the sum of the usage amounts or the sum of the usage rates.

41. The transmission power control method according to claim 36, wherein the executing includes executing the uplink transmission power control by further using a first loss parameter representing a propagation loss between the first cell and the target cell.

42. The transmission power control method according to claim 41, wherein the first loss parameter is defined as a propagation loss between the first base station and a mobile station belonging to the target cell.

43. A non-transitory computer readable medium that stores a program for causing a computer to perform a transmission power control method used in a wireless communication, wherein the wireless communication system includes a first base station that forms a first cell and a plurality of second base stations that form a plurality of second cells each having an area smaller than that of the first cell and each including a portion thereof partially overlapping with the first cell, and the transmission power control method includes executing uplink transmission power control for a target cell included in the plurality of second cells by using a resource parameter which increases and decreases in accordance with a sum of usage amounts or sum of usage rates of uplink resources in the plurality of second cells, wherein the executing includes executing the uplink transmission power control by further using a correction parameter defined as a monotonic increasing or decreasing function of a usage quantity or usage rate of uplink resources in the target cell, and the correction parameter is determined to keep a sum across the plurality of second cells substantially constant.

44. A wireless communication system comprising:

a first base station that forms a first cell;

a plurality of second base stations that form a plurality of second cells each having an area smaller than that of the first cell and each including a portion thereof partially overlapping with the first cell;

a control apparatus configured to execute uplink transmission power control for a target cell included in the plurality of second cells by using a resource parameter which increases and decreases in accordance with a sum of usage amounts or sum of usage rates of uplink resources in the plurality of second cells; and a supply apparatus configured to collect a usage quantity or a usage rate of resources in each second cell, generate the resource parameter, and supply the resource parameter to the control apparatus.

45. A transmission power control apparatus used in a wireless communication system including a first base station that forms a first cell, and a plurality of second base stations that form a plurality of second cells each having an area smaller than that of the first cell and each including a portion thereof partially overlapping with the first cell, the transmission power control apparatus comprising:

a memory that stores instructions; and at least one hardware processor configured to execute the instructions to perform uplink transmission power control for a target cell included in the plurality of second cells by using a resource parameter which increases and decreases in accordance with a sum of usage amounts or sum of usage rates of uplink resources in the plurality of second cells, wherein the uplink transmission power control includes:

adjusting a target received power, at a target base station forming the target cell, of an uplink signal transmitted from a mobile station belonging to the target cell; and informing a plurality of mobile stations belonging to the target cell about an average value of the target received power applied to the plurality of mobile stations.

46. The transmission power control apparatus according to claim 45, wherein the uplink transmission power control further includes informing each of the plurality of mobile stations belonging to the target cell about a difference, per mobile station, with respect to the average value of the target received power.

47. A transmission power control method used in a wireless communication system including a first base station that forms a first cell and a plurality of second base stations that form a plurality of second cells each having an area smaller than that of the first cell and each including a portion thereof partially overlapping with the first cell, the method comprising executing uplink transmission power control for a target cell included in the plurality of second cells by using a resource parameter which increases and decreases in accordance with a sum of usage amounts or sum of usage rates of uplink resources in the plurality of second cells, wherein the uplink transmission power control includes:
adjusting a target received power, at a target base station forming the target cell, of an uplink signal transmitted from a mobile station belonging to the target cell; and
informing a plurality of mobile stations belonging to the target cell about an average value of the target received power applied to the plurality of mobile stations.

48. The transmission power control method according to claim 47, wherein the uplink transmission power control further includes informing each of the plurality of mobile stations belonging to the target cell about a difference, per mobile station, with respect to the average value of the target received power.

49. A non-transitory computer readable medium that stores a program for causing a computer to perform a transmission power control method used in a wireless communication, wherein
the wireless communication system includes a first base station that forms a first cell and a plurality of second base stations that form a plurality of second cells each having an area smaller than that of the first cell and each including a portion thereof partially overlapping with the first cell, and
the transmission power control method includes executing uplink transmission power control for a target cell included in the plurality of second cells by using a resource parameter which increases and decreases in accordance with a sum of usage amounts or sum of usage rates of uplink resources in the plurality of second cells, wherein
the uplink transmission power control includes:
adjusting a target received power, at a target base station forming the target cell, of an uplink signal transmitted from a mobile station belonging to the target cell; and
informing a plurality of mobile stations belonging to the target cell about an average value of the target received power applied to the plurality of mobile stations.

50. The non-transitory computer readable medium according to claim 49, wherein the uplink transmission power control further includes informing each of the plurality of mobile stations belonging to the target cell about a difference, per mobile station, with respect to the average value of the target received power.

\* \* \* \* \*